(12) United States Patent
Nakano et al.

(10) Patent No.: US 7,912,789 B2
(45) Date of Patent: Mar. 22, 2011

(54) ELECTRONIC VALUE, ELECTRONIC PURSE DEVICE, AND SYSTEM FOR USING THE SAME

(75) Inventors: Toshihisa Nakano, Osaka (JP); Motoji Ohmori, Osaka (JP)

(73) Assignee: Panasonic Corporation, Osaka (JP)

( * ) Notice: Subject to any disclaimer, the term of this patent is extended or adjusted under 35 U.S.C. 154(b) by 1106 days.

(21) Appl. No.: 11/632,147

(22) PCT Filed: Jun. 14, 2005

(86) PCT No.: PCT/JP2005/010875
§ 371 (c)(1),
(2), (4) Date: Jan. 11, 2007

(87) PCT Pub. No.: WO2006/008895
PCT Pub. Date: Jan. 26, 2006

(65) Prior Publication Data
US 2008/0067240 A1    Mar. 20, 2008

(30) Foreign Application Priority Data

Jul. 22, 2004 (JP) ................................ 2004-214915

(51) Int. Cl.
*G06Q 20/00* (2006.01)
(52) U.S. Cl. .......................................... 705/64; 705/51
(58) Field of Classification Search .................... 705/64, 705/51
See application file for complete search history.

(56) References Cited

U.S. PATENT DOCUMENTS

| | | | |
|---|---|---|---|
| 6,079,021 A * | 6/2000 | Abadi et al. ................ | 726/14 |
| 6,766,306 B1 | 7/2004 | Matsuyama | |
| 6,879,966 B1 * | 4/2005 | Lapsley et al. .................. | 705/78 |
| 6,883,715 B1 * | 4/2005 | Fruhauf et al. ................. | 235/492 |
| 7,155,418 B2 | 12/2006 | Matsuyama | |
| 2002/0049912 A1 | 4/2002 | Honjo et al. | |
| 2002/0181710 A1 * | 12/2002 | Adam et al. ................... | 380/270 |
| 2004/0098350 A1 * | 5/2004 | Labrou et al. .................. | 705/64 |
| 2004/0230536 A1 * | 11/2004 | Fung et al. ..................... | 705/64 |
| 2005/0027543 A1 * | 2/2005 | Labrou et al. .................... | 705/1 |
| 2005/0055270 A1 * | 3/2005 | Broe ................................ | 705/14 |
| 2007/0050300 A1 | 3/2007 | Matsuyama | |

FOREIGN PATENT DOCUMENTS

| | | |
|---|---|---|
| CN | 1383100 | 12/2002 |
| JP | 09-128663 | 5/1997 |

(Continued)

OTHER PUBLICATIONS

Partial English translation of Japanese Patent Application Publication No. 10-307885, published Nov. 17, 1998.

*Primary Examiner* — Evens J Augustin
(74) *Attorney, Agent, or Firm* — Wenderoth, Lind & Ponack, L.L.P.

(57) ABSTRACT

An electronic money usage system is capable of preventing dishonest use of electronic money recorded on a recording medium. A memory card 300 acquires signature-type electronic data from a bank server apparatus 100, and generates a first authenticator using the received first authenticator, and an identification flag, an electronic money ID and an amount included in the electronic money. When a user uses the signature-type electronic money, the memory card 300 generates a second authenticator with use of a second password received from the user, and the identification flag, electronic money ID and amount included in the electronic money. The memory card 300 outputs the electronic money if the first authenticator and the second authenticator match.

10 Claims, 17 Drawing Sheets

FOREIGN PATENT DOCUMENTS

| | | |
|---|---|---|
| JP | 10-307885 | 11/1998 |
| JP | 2000-113085 | 4/2000 |
| JP | 2001-14388 | 1/2001 |
| JP | 2002-132730 | 5/2002 |
| JP | 2002-353958 | 12/2002 |
| JP | 2003-134100 | 5/2003 |
| JP | 2003-196554 | 7/2003 |
| JP | 2004-139604 | 5/2004 |

* cited by examiner

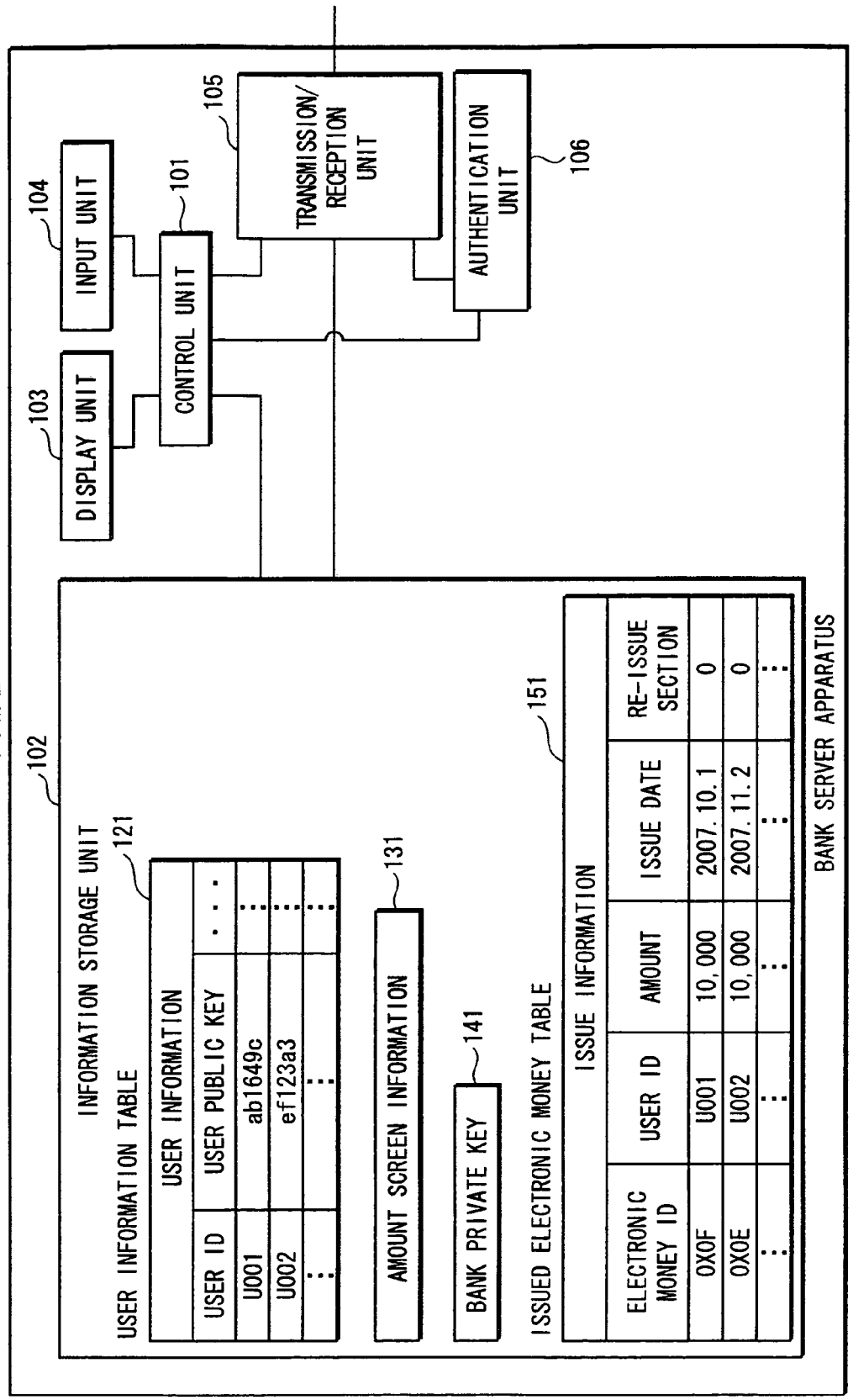

FIG. 3A
ELECTRONIC MONEY 501

| IDENTIFICATION FLAG | 1 |
|---|---|
| ELECTRONIC MONEY ID | 0x0F |
| AMOUNT | 10,000 |
| FIRST AUTHENTICATOR Sign1 | BLANK |
| SECOND AUTHENTICATOR Sign2 | BLANK |

FIG. 3B
ELECTRONIC MONEY 502

| IDENTIFICATION FLAG | 1 |
|---|---|
| ELECTRONIC MONEY ID | 0X0F |
| AMOUNT | 10,000 |
| FIRST AUTHENTICATOR Sign1 | E1(PW1, 1 \|\| 0x0F \|\| 10000) |
| SECOND AUTHENTICATOR Sign2 | BLANK |

FIG. 3C
ELECTRONIC MONEY 503

| IDENTIFICATION FLAG | 1 |
|---|---|
| ELECTRONIC MONEY ID | 0X0F |
| AMOUNT | 10,000 |
| FIRST AUTHENTICATOR Sign1 | E1(PW1, 1 \|\| 0x0F \|\| 10000) |
| SECOND AUTHENTICATOR Sign2 | E1(PW2, 1 \|\| 0x0F \|\| 10000) |

FIG. 3D
ELECTRONIC MONEY 504

| IDENTIFICATION FLAG | 0 |
|---|---|
| ELECTRONIC MONEY ID | 0X00 |
| AMOUNT | 10,000 |
| FIRST AUTHENTICATOR Sign1 | 0x0000 |
| SECOND AUTHENTICATOR Sign2 | 0x0000 |

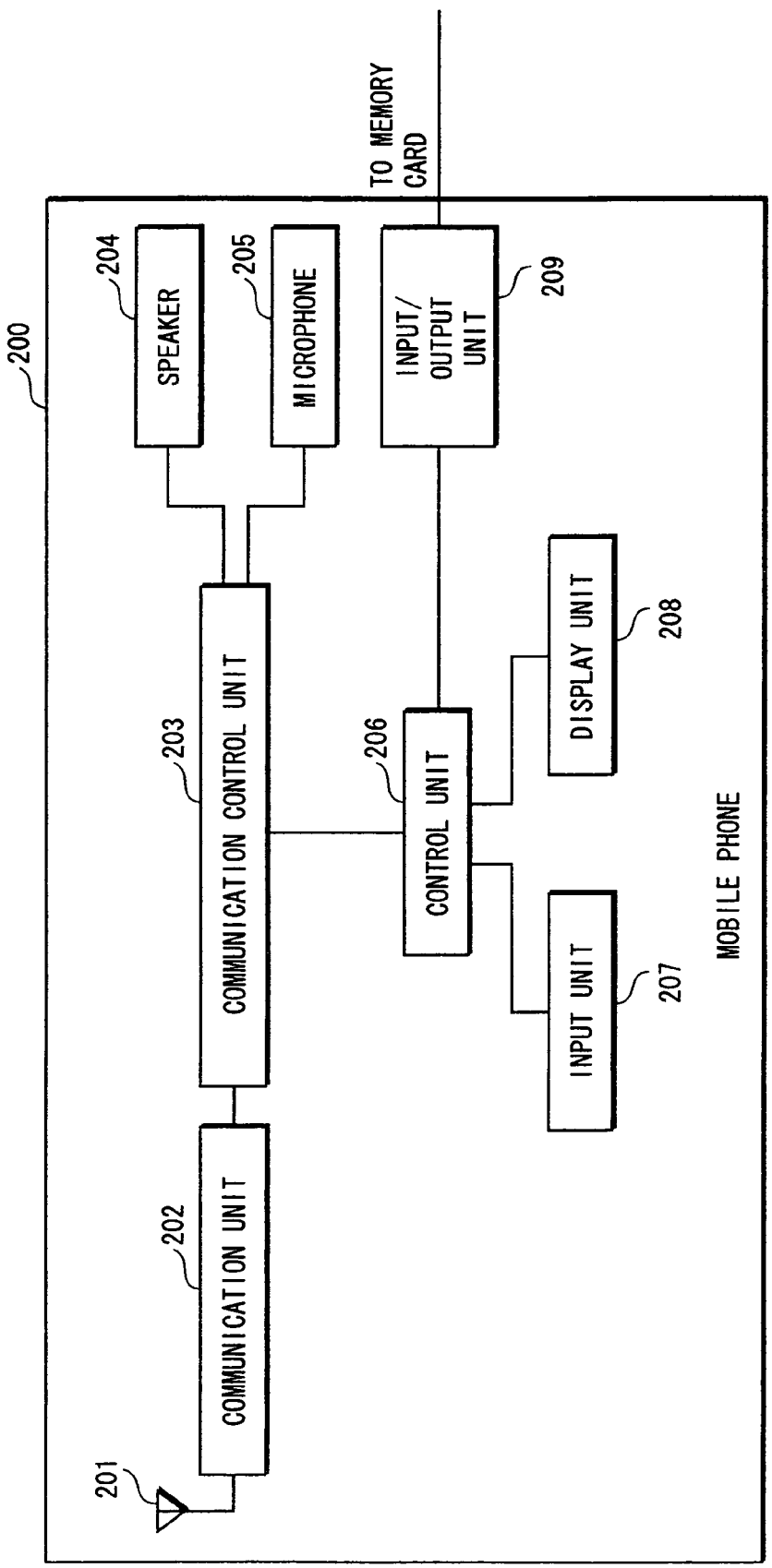

FIG. 16A

ELECTRONIC MONEY (BEFORE USE)     511

| IDENTIFICATION FLAG | 1 |
|---|---|
| ELECTRONIC MONEY ID | 0X0F |
| AMOUNT | 10,000 |
| FIRST AUTHENTICATOR Sign1 | E1(PW1, 1 \|\| 0x0F \|\| 10000) |
| SECOND AUTHENTICATOR Sign2 | (BLANK) |

FIG. 16B

ELECTRONIC MONEY (BALANCE)     512

| IDENTIFICATION FLAG | 1 |
|---|---|
| ELECTRONIC MONEY ID | 0X0F |
| AMOUNT | 9,000 |
| FIRST AUTHENTICATOR Sign1 | E1(PW2, 1 \|\| 0x0F \|\| 9000) |
| SECOND AUTHENTICATOR Sign2 | (BLANK) |

FIG. 16C

NEW ELECTRONIC MONEY (USAGE AMOUNT)     513

| IDENTIFICATION FLAG | 0 |
|---|---|
| ELECTRONIC MONEY ID | 0X00 |
| AMOUNT | 1,000 |
| FIRST AUTHENTICATOR Sign1 | 0x0000 |
| SECOND AUTHENTICATOR Sign2 | 0x0000 |

FIG. 17

ELECTRONIC MONEY  521

| | | |
|---|---|---|
| 531 { | IDENTIFICATION FLAG | 1 |
| | ID | 0x0F |
| 532 { | AMOUNT | 1,000 |
| | FIRST AUTHENTICATOR Sign1 | E1(PW, 1 \|\| 0x0F \|\| 1000) |
| | SECOND AUTHENTICATOR Sign2 | |
| 533 { | AMOUNT | 1,000 |
| | FIRST AUTHENTICATOR Sign1 | E1(PW, 1 \|\| 0x0F \|\| 1000) |
| | SECOND AUTHENTICATOR Sign2 | |
| | ⋮ | ⋮ |
| 534 { | AMOUNT | 1,000 |
| | FIRST AUTHENTICATOR Sign1 | E1(PW, 1 \|\| 0x0F \|\| 1000) |
| | SECOND AUTHENTICATOR Sign2 | |

ELECTRONIC VALUE, ELECTRONIC PURSE DEVICE, AND SYSTEM FOR USING THE SAME

TECHNICAL FIELD

The present invention relates to a technique for using an electronic value that is information representing a value electronically.

BACKGROUND ART

Following advancements in information security techniques such as cryptology techniques and digital signature techniques, progress has been made in research and development to make electronic money a viable substitute for currency, and such electronic money is already in actual use to some extent.

Patent Document 1 discloses a technique that aims to realize safe circulation of electronic money deposited in an IC card. With an object of performing online transfer of electronic money from an electronic purse to an IC card and from a bank account to the electronic purse while ensuring high reliability, this document discloses a technique for transferring from an account at a financial institution to an electronic purse, and transferring electronic money from the electronic purse to an IC card inserted in the electronic purse. Here, after the IC card which has had the electronic money deposited therein is removed from the electronic purse, the balance of the IC card is automatically extinguished therefrom if account settlement using the electronic money is not performed within a certain length of time.

Patent Document 2 discloses a theft prevention system that, with a simple structure, enables a location of a theft prevention target object that has been stolen or lost to be specified. This is realized by mounting a wireless communication device in the theft prevention target object. The wireless communication device conforms to a communication format of a simple mobile phone system, and transmits its own terminal identification number with a predetermined timing. The location of the theft prevention target object is managed by managing the location of the wireless communication device based on the terminal identification number received from the wireless communication device and a base station identification number of a base station that received the terminal identification number.

Patent Document 1: Japanese Patent Application Publication No. 2004-139604
Patent Document 2: Japanese Patent Application Publication No. H09-128663

DISCLOSURE OF THE INVENTION

Problem to be Solved by the Invention

Although electronic money can be handled securely to a certain extent with the conventional techniques, progress is currently being made with respect to techniques for using electronic money, and there are demands for development of various techniques that enable electronic money to be used securely and reliably.

In response to such demands, the present invention has an object of providing an electronic value, an electronic value usage system, an electronic purse apparatus, a account settlement apparatus, and an electronic value management method and a computer program used in an electronic purse apparatus, all of which are capable of preventing dishonest use of an electronic value recorded on a recording medium such as a memory card that stores the electronic value that is information expressing a value electronically, even if the recording medium is lost or stolen.

Means to Solve the Problem

In order to achieve the stated object, the present invention is an electronic value usage system for using an electronic value that is information representing a value electronically, the electronic value usage system including: an acquisition unit operable to acquire value information; a first generation unit operable to generate a first authenticator with use of the value information and first data acquired when storing the value information; a storage unit operable to store the value information and the first authenticator in correspondence with each other as an electronic value; a second generation unit operable to generate a second authenticator with use of the value information and second data acquired when a user uses the electronic value; a judgment unit operable to judge whether or not the first authenticator and the second authenticator match each other; and a permission unit operable to, when the first authenticator and the second authenticator are judged to match each other, permit usage of, from among the electronic value, a usage value desired by the user.

EFFECTS OF THE INVENTION

With the stated structure, use of the usage value is permitted when the first authenticator and the second authenticator match. Here, if the user at the time of acquiring the electronic value and the user at the time of using the electronic value are the same person, identical first data and second data will be able to be provided, and therefore the first authenticator and the second authenticator will of course match.

However, if the storage unit that stores the electronic value is lost or stolen, a person who attempts to dishonestly use the electronic value stored in the storage unit does not know the first data. Consequently, the possibility that the first data and the second data will match is low, and the possibility that the first authenticator and the second authenticator will match is low. This means that use of the electronic value will not be permitted, and enables the electronic value to be protected from dishonest use.

Here, the electronic value usage system may include an electronic purse apparatus and an account settlement apparatus, wherein the electronic purse-apparatus includes the acquisition unit, the first generation unit, the storage unit and the second generation unit, and the account settlement apparatus includes the judgment unit and the permission unit.

With the stated structure, the account settlement apparatus permits use of the usage value when the first authenticator and the second authenticator are judged to match. This prevents dishonest account settlement being made with a dishonestly used electronic value.

Here, the electronic value usage system may be an electronic purse apparatus that is a portable IC card.

With the stated structure, the usage system is easily portable.

Furthermore, the present invention is an electronic purse apparatus that stores and manages an electronic value that is information representing a value electronically, the electronic purse apparatus including: an acquisition unit operable to acquire value information; a first generation unit operable to generate a first authenticator with use of the value information and first data acquired when storing the value information; a storage unit operable to store the value information and the first authenticator in correspondence with each other as an electronic value; a second generation unit operable to generate a second authenticator with use of the value information and second data acquired when a user uses the electronic value; a judgment unit operable to judge whether or not the first authenticator and the second authenticator match each other; and an output unit operable to, when the first authenticator and the second authenticator are judged to match each other, output, from among the electronic value, a usage value desired by the user.

With the stated structure, use of the usage value is permitted when the first authenticator and the second authenticator match. As described earlier, use of the electronic value will not be permitted if the electronic purse apparatus that stores the electronic value is lost or stolen, and therefore the electronic value can be protected from dishonest use.

Here, the first generation unit may include: a first data acquisition sub-unit operable to acquire the first data; and a first authenticator generation sub-unit operable to generate the first authenticator by subjecting the value information to one of encryption and digital signature, with use of the acquired first data, and the second generation unit may include: a second data acquisition sub-unit operable to acquire the second data; and a second authenticator generation sub-unit operable to generate the second authenticator by subjecting the value information to one of encryption and digital signature, with use of the acquired second data.

With the stated structure, the authenticators can be generated reliably using encryption or a digital signature.

Here, when an entire value shown by the value information is used, the output unit may output the value information as the usage value information, and deletes the electronic value from the storage unit.

With the stated structure, the whole of the electronic value can be used.

Here, the electronic purse apparatus may further include: a calculation unit operable to, when a partial value that is part of the value shown by the value information is used, subtract the partial value from the value shown by the value information, thereby calculating a remaining value; and a third generation unit operable to generate a third authenticator with use of the second data and the calculated remaining value, wherein the storage unit further stores, in place of the electronic value, the remaining value and the third authenticator in correspondence with each other as a new electronic value.

With the stated structure, a partial value that is part of the electronic value can be used.

Here, the acquisition unit may further acquire other value information, the first generation unit may further generate a third authenticator using the acquired first data and the other value information, the storage unit may further store the other value information and the third authenticator in correspondence as another electronic value, and the output unit, when the user desires to use one or more electronic values, may output respective value information of the one or more electronic values, as the usage value information, and delete the one or more electronic values from the storage unit.

With the stated structure, a plurality of electronic values can be stored and managed in the electronic purse apparatus.

Furthermore, the present invention is an electronic purse apparatus that stores and manages an electronic value that is information representing a value electronically, the electronic purse apparatus including: an acquisition unit operable to acquire value information; a first generation unit operable to generate a first authenticator with use of the value information and first data acquired when storing the value information; a storage unit operable to store the value information and the first authenticator in correspondence with each other as an electronic value; a second generation unit operable to generate a second authenticator with use of the value information and second data acquired when a user uses the electronic value; and an output unit operable to output the value information, the first authenticator, and the second authenticator.

With the stated structure, in the account settlement apparatus that receives the first authenticator and the second authenticator from the electronic purse apparatus, dishonest usage of the electronic value can be prevented by permitting use of the electronic value when the first authenticator and the second authenticator match.

Here, the first generation unit may include: a first data acquisition sub-unit operable to acquire the first data; and a first authenticator generation sub-unit operable to generate a first private key from the acquired first data, and generate the first authenticator by subjecting the value information to a public key method digital signature with use of the generated first private key, and the second generation unit may include: a second data acquisition sub-unit operable to acquire the second data; a second authenticator generation sub-unit operable to generate a second private key from the acquired second data, and generate the second authenticator by subjecting the value information to the public key method digital signature with use of the generated second private key; and a public key generation sub-unit operable to generate a public key from the generated second private key, and the output unit further outputs the generated public key.

With the stated structure, in the account settlement apparatus that receives the first authenticator, the second authenticator and the public key from the electronic purse apparatus, dishonest usage of the electronic value can be prevented by permitting use of the electronic value both when the first authenticator and the second authenticator match and verification of the second authenticator according to the public key succeeds.

Furthermore, the present invention is an electronic purse apparatus that stores and manages an electronic value that is information representing a value electronically, the electronic purse apparatus including: a data storage unit operable to store in advance first data acquired from a user; an acquisition unit operable to acquire value information; a storage unit operable to store the acquired value information; an acquisition unit operable to acquire second data from the user when the user uses the electronic value; a judgment unit operable to judge whether or not the first data and the second data match each other; a signature unit operable to, when the first data and the second data are judged to match each other, generate value authentication information corresponding to the stored value information or part thereof; and an output unit operable to output the value information or the part thereof, and the generated value authentication data. Furthermore, the present invention is an account settlement apparatus that performs account settlement processing using a received electronic value, the account settlement apparatus including: an acquisition unit operable to acquire, from the above-described electronic purse apparatus, the value information, the first authenticator and the second authenticator; a judgment unit operable to judge whether or not the first authenticator and the second authenticator match each other; and an account settlement unit operable to, when the first authenticator and the second authenticator are judged to match each other, perform account settlement processing with use of a usage value desired by the user.

With the stated structure, the value information is output when the stored first data and the input second data match. This prevents the electronic value being output dishonestly.

BRIEF DESCRIPTION OF THE DRAWINGS

FIG. 2 is a block diagram showing the structure of a bank server apparatus 100;

FIGS. 3A to 3D show examples of the data structure of cash-type and signature-type electronic money; FIG. 3A shows an example of the data structure of signature-type electronic money before a first authenticator and a second authenticator are written thereto;

FIG. 3B shows an example of the data structure of signature-type electronic money when the first authenticator has been written thereto;

FIG. 3C shows an example of the data structure of signature-type electronic money when the first authenticator and the second authenticator have been written thereto;

FIG. 3D shows an example of the data structure of cash-type electronic money, or signature-type electronic money after being converted to cash-type electronic money;

FIG. 4 is a block diagram showing the structure of a mobile phone 200;

FIGS. 16A to 16C show examples of the data structure of electronic money in the case of using part of an amount included in electronic money;

FIG. 16A shows an example of the data structure of electronic money before use;

FIG. 16B shows an example of the data structure of electronic money that includes a balance after usage;

FIG. 16C shows an example of the data structure of electronic money that includes a used amount; and FIG. 17 shows an example of the data structure of electronic money in the case of one piece of electronic money including a plurality of amounts.

DESCRIPTION OF NUMERIC REFERENCES

Figure 1:
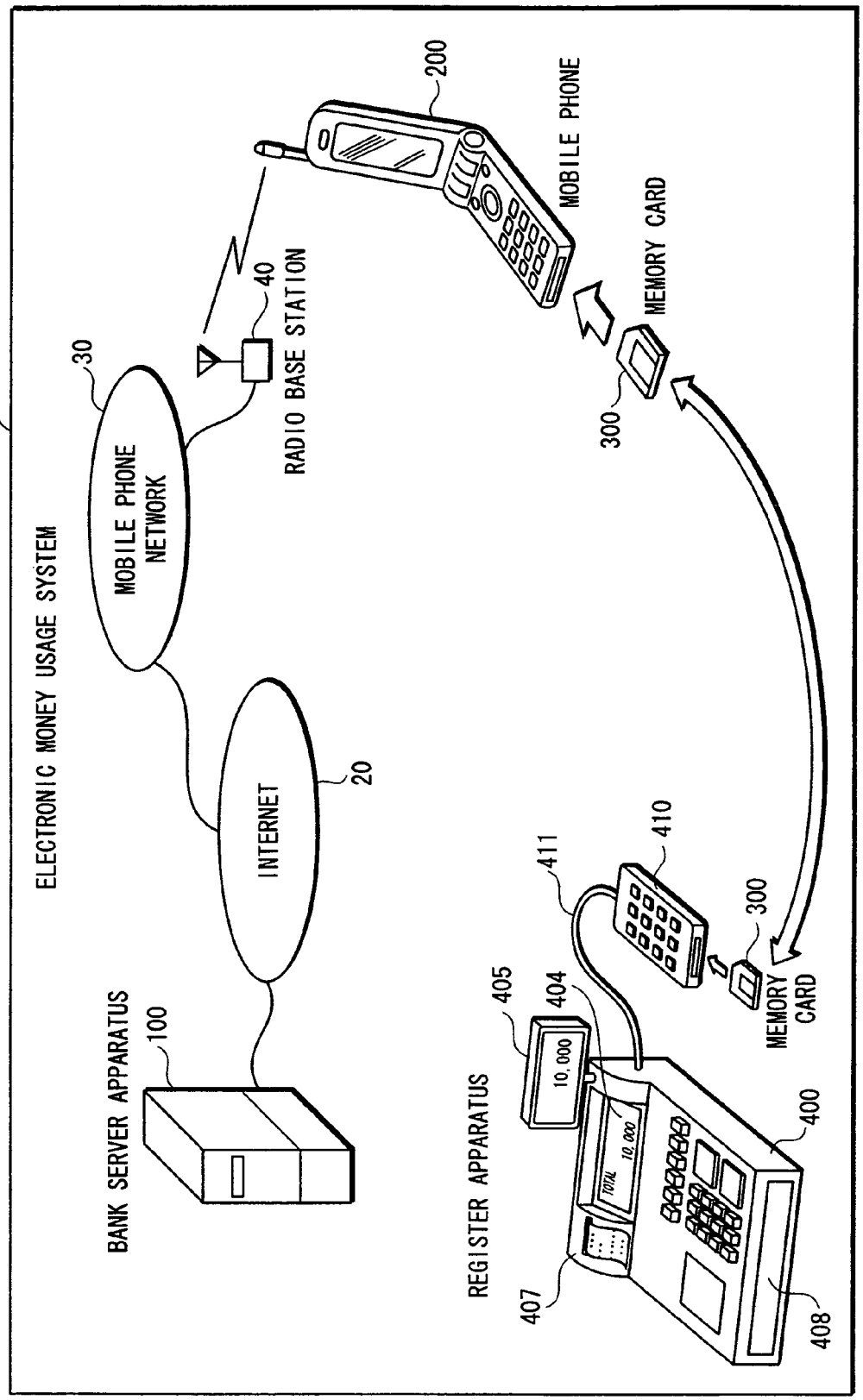
FIG. 1 is a system structure diagram showing the structure of an electronic money usage system 10.

10 Electronic money usage system
10a Electronic money usage system
20 Internet
30 Mobile phone network
40 Radio base station
100 Bank server apparatus
101 Control unit
102 Information storage unit
103 Display unit
104 Input unit
105 Transmission/reception unit
106 Authentication unit
200 Mobile phone
201 Antenna
202 Communication unit
203 Communication control unit
204 Speaker
205 Microphone
206 Control unit
207 Input unit
208 Display unit
209 Input/output unit
300 Memory card
301 Input/output unit
302 Control unit
303 Authentication unit
304 Information storage unit
400 Register apparatus
401 Key storage unit
402 Authentication unit
403 Input unit
404 Display unit
405 Display unit
406 Control unit
407 Printing unit
408 Cash compartment
409 Information storage unit
410 Input/output unit
411 Cable

BEST MODE FOR CARRYING OUT THE INVENTION

1. Electronic Money Usage System 10

The following describes an electronic money usage system 10 as a first embodiment of the present invention.

1.1 Structure of the Electronic Money Usage System 10

As shown in FIG. 1, the electronic money usage system 10 is composed of a bank server apparatus 100, a mobile phone 200, a memory card 300 that is a portable medium, and a register apparatus 400. The bank server apparatus 100 and the mobile phone 200 are connected via the Internet 20, a mobile phone network 30 and a radio base station 40.

The bank server apparatus 100 provides either cash-type electronic money or signature-type electronic money to a user in response to a request from the user. Cash-type and signature-type electronic money are described later.

When the user requests cash-type electronic money, the mobile phone 200 securely and reliably acquires cash-type electronic money of an amount requested by the user according to a user instruction, from the bank server apparatus 100 via the Internet 20, the mobile phone network 30 and the radio base station 40. The mobile phone 200 writes the acquired cash-type electronic money to the memory card 300.

Next, when the user purchases a product or receives provision of a service and performs account settlement for the product or service using the cash-type electronic money, the memory card 300 to which the electronic money has been written is mounted in an input/output unit 410 of the register apparatus 400. The register apparatus 400 receives the electronic money from the memory card 300 via the input/output unit 410, and performs the account settlement using the received electronic money. At this time the memory card 300 deletes the stored electronic money.

When the user requests signature-type electronic money, the mobile phone 200 securely and reliably obtains cash-type electronic money of an amount requested by the user according to a user instruction, from the bank server apparatus 100 via the Internet 20, the mobile phone network 30 and the radio base station 40. The mobile phone 200 then receives input of a first password from the user, generates a first authenticator with use of the input first password, writes the generated first authenticator into the obtained electronic money, and writes the electronic money including the first authenticator to the memory card 300.

When the user purchases a product or receives provision of a service and performs account settlement for the product or service using the cash-type electronic money, the memory card 300 to which the electronic money has been written is mounted in an input/output unit 410 of the register apparatus 400. The input/output unit 410 receives input of a second password from the user, and outputs the received second password securely to the memory card 300. The memory card 300 receives the second password securely, and generates a second authenticator using the received second password. The memory card 300 then judges whether or not the first authenticator included in the stored electronic money matches the generated second authenticator, and when the two are judged to match, transmits the electronic money securely and reliably to the register apparatus 400. At this time, the memory card 300 deletes the stored electronic money. The register apparatus 400 receives the electronic money and performs the account settlement using the received electronic money.

1.2 Structure of the Bank Server Apparatus 100

As shown in FIG. 2, the bank server apparatus 100 is composed of a control unit 101, an information storage unit 102, a display unit 103, an input unit 104, a transmission/reception unit 105 and an authentication unit 106.

The bank server apparatus 100 is a computer system specifically composed of a microprocessor, a ROM, a RAM, a hard disk unit, a communication unit, a display unit, a keyboard, a mouse, and the like. Computer programs are stored in the RAM or the hard disk unit. The compositional elements of the bank server apparatus 100 achieve their functions by the microprocessor operating according to the programs.

(1) Information Storage Unit 102

The information storage unit 102 stores in advance a user information table 121, amount screen information 131, a bank private key 141, and an issued money table 151.

The amount screen information 131 is information that composes a screen that is displayed by the mobile phone 200 and is for receiving input of an electronic money type and an electronic money amount.

Here, the electronic money type is information showing whether the electronic money is cash-type of signature-type.

The bank private key 141 is a private key in the bank server apparatus 100, and is key data that is 160 bits in length.

The user information table 121 includes a plurality of pieces of user information, each of which corresponds to a user and includes information such as a user ID, a user public key, and other information. Here, the user ID is identification information identifying a user. The user public key is a public key that is generated based on a public key generation algorithm of public key encryption, using a user private key allocated to the memory card of the user as a basis. The user public key is key data of 160 bits in length. Here, the public key algorithm is based on elliptic curve encryption. Since elliptic curve encryption is commonly known, a detailed description thereof is omitted here. One example of the other information is contact details of the user.

The issued electronic money table 151 includes a plurality of pieces of issued information, each of which corresponds to electronic money already issued, and includes an electronic money ID, a user ID, an amount, an issue date, and a reissue section. Here, the electronic money ID is identification information identifying the corresponding electronic money. The user ID is identification information identifying the user who requested issue of the corresponding electronic money. The amount shows the amount of the corresponding electronic money. The issue date shows the date on which the corresponding electronic money was issued. The reissue section shows whether or not the corresponding electronic money has been reissued. The reissue section can have a value of either "0" or "1", with the value of "0" showing that the corresponding electronic money has not been reissued, and the value of "1" showing that the corresponding electronic money has been reissued.

(2) Transmission/Reception Unit 105

The transmission/reception unit 105 is connected to the mobile phone 200 via the Internet 20, the mobile phone network 30 and the wireless base station 40. The transmission/reception unit 105 performs transmission/reception of information between the mobile phone 200 and the control unit 101, between the mobile phone 200 and the authentication unit 106, and between the mobile phone 200 and the information storage unit 102.

(3) Authentication Unit 106

Based on an instruction from the control unit 101, the authentication unit 106 performs mutual device authentication with the memory card 300 via the transmission/reception unit 105, the Internet 20, the wireless base station 40 and the mobile phone 200, and if the mutual device authentication succeeds, the authentication unit 106 also performs key sharing. A session key is generated as a result of this key sharing. Here, device authentication is challenge-response authentication. Since challenge-response authentication is commonly known, a detailed description thereof is omitted here.

The authentication unit 106 outputs an authentication result showing a result of the mutual device authentication, in other words, whether the mutual device authentication has succeeded or failed, to the control unit 101. When the result of the mutual device authentication shows success, the authentication unit 106 further outputs the generated session key to the control unit 101 if a session key has been generated.

Note that since mutual device authentication and key sharing are commonly known, a detailed description thereof is omitted here.

(4) Control Unit 101

(Mutual Authentication and Key Sharing)

The control unit 101 receives a connection instruction instructing connection of the bank sever apparatus 100 and the memory card 300.

Having received the connection instruction, the control unit 101 instructs the authentication unit 106 to perform mutual device authentication, and further instructs the authentication unit 106 to perform key sharing in the case that mutual device authentication succeeds. The control unit 101 then receives the authentication result from the authentication unit 106, and receives the session key in the case that device authentication has been successful. The control unit 101 also transmits the authentication result to the mobile phone 200.

When the authentication result shows failure, the control unit 101 ends the electronic money acquisition-processing.

(User ID Search)

When the authentication result shows success, the control unit 101 receives a user ID identifying the user of the memory card 300 from the memory card 300 via the mobile phone 200, the radio base station 40, the mobile phone network 30, the Internet 20 and the transmission/reception unit 105. The control unit 101 then searches the user information table 121 stored in the information storage unit 102 for a user ID that matches the received user ID. When the received user ID does not exist in the user information table 121, the control unit 101 transmits a message to that effect to the mobile phone 200, and ends the electronic money acquisition processing.

(Transmission of Amount Screen Information)

When the received user ID exists in the user information table 121, the control unit 101 reads the amount screen information 131 from the information storage unit 102 and transmits the read amount screen information 131 to the mobile phone 200 via the transmission/reception unit 105, the Internet 20, the mobile phone network 30 and the radio base station 40.

(Verification of Amount Signature Data)

Next, the control unit 101 receives the type of the acquired electronic money, amount information showing the amount of the electronic money, and amount signature data generated for the amount information, from the memory card 300 via the mobile phone 200, the radio base station 40, the mobile phone network 30, the Internet 20 and the transmission/reception unit 105. The control unit 101 reads the user public key corresponding to the received user ID, and performs verification of the received amount signature data by subjecting the received amount information and amount signature data to a digital signature verification algorithm. Note that since digital signature verification algorithms are commonly known, a detailed description thereof is omitted here.

When the verification fails, the control unit 101 transmits a message to that effect to the mobile phone 200, and ends the electronic money acquisition processing.

(Generation of Signature-Type and Cash-Type Electronic Money)

When the verification succeeds, the control unit 101 judges which of cash-type or signature-type the received electronic money is. When the received electronic money type is judged to be cash-type, the control unit 101 generates cash-type electronic money as described below. When the received electronic money type is judged to be signature-type, the control unit 101 generates signature-type electronic money as described below.

Here, as shown in the examples in FIGS. 3A, 3B, 3C and 3D, both the cash-type and the signature-type electronic money are composed of an identification flag, an electronic money ID, an amount, a first authenticator, and a second authenticator.

The identification flag is a flag showing whether the corresponding electronic money is cash-type or is signature-type. The identification flag being "0" shows that the electronic money is cash-type, and the identification flag being "1" shows that the electronic money is signature-type.

The electronic money ID has a fixed value in the case of the corresponding electronic money being cash-type. Specifically, the electronic money ID is "0x00". Note that in the present Description, "0x" indicates a value expressed according to hexadecimal notation. In the case of the corresponding electronic money being signature-type, the electronic money ID is identification information identifying the electronic money.

The amount shows a value of the corresponding electronic money as currency in the case of electronic money being used as currency.

The first authenticator and the second authenticator each have a fixed value in the case of the corresponding electronic money being cash-type. Specifically, the first authenticator and the second authenticator each have a value "0x0000". In the case of the corresponding electronic money being signature-type, the first authenticator and the second authenticator are authentication-use data that has been generated based on a password input by the user, and the identification flag, the electronic money ID and the amount included in the electronic money. Details of how the of the first authenticator and the second authenticator are generated are given later.

(Generation of Cash-Type Electronic Money)

When the electronic money type is judged to be cash-type, the control unit 101 generates electronic money composed of an identification flag having a value "0", an electronic money ID having a value "0x00", an amount that is the amount information received from the memory card 300, and a first authenticator and a second authenticator each having a value "0x0000". The electronic money generated here is cash-type.

One example of cash-type electronic money is shown in FIG. 3D. The electronic money shown in FIG. 3D is composed of a flag identifier "0", an electronic money identifier "0x00", an amount "10000", a first authenticator "0x0000" and a second authenticator "0x0000".

(Generation of Signature-Type Electronic Money)

When the electronic money type is judged to be signature-type, the control unit 101 generates electronic money composed of an identification flag having a value "1", an electronic money ID having a value that uniquely identifies the electronic money, and an amount that is the amount information received from the memory card 300, and the first authenticator and the second authenticator left blank. The electronic money generated here is signature-type.

One example of signature-type electronic money is shown in FIG. 3A. Electronic money 501 shown in FIG. 3A is composed of an identification flag "1", an electronic money ID "0x0F", an amount "10000", a first authenticator "blank" and a second authenticator "blank".

(Generation and Transmission of Electronic Money Signature Data)

The control unit 101 reads the bank private key 141 from the information storage unit 102, and generates electronic money signature data by subjecting the generated cash-type or signature-type electronic money to a digital signature with use of the read bank private key 141. The control unit 101 then transmits the generated electronic money signature data and the generated cash-type or signature-type electronic money to the memory card 300 via the transmission/reception unit 105, the Internet 20, the mobile phone network 30, and the mobile phone 200.

(5) Input Unit 104 and Display Unit 103

The input unit 104 receives an instruction or input of information from an operator of the bank server apparatus 100, and outputs the received instruction or input information to the control unit 101.

The display unit 103 displays various information under the control of the control unit 101.

1.3 Structure of the Mobile Phone 200

As shown in FIG. 4, the mobile phone 200 is composed of an antenna 201, a communication unit 202, a communication control unit 203, a speaker 204, a microphone 205, a control unit 206, an input unit 207, a display unit 208, and an input/output unit 209.

The mobile phone 200 is a computer system specifically composed of a microprocessor, a signal processor, a ROM, a RAM, and the like. Computer programs are stored in the RAM. The compositional elements of the mobile phone 200 achieve part of their functions by the microprocessor and the signal processor operating according to the computer programs.

(1) Antenna 201, Communication Unit 202, Communication Control Unit 203

The communication unit 202 amplifies a radio frequency signal received by the antenna 201, converts the output signal to an IF signal, amplifies the IF signal, and demodulates amplified IF signal to a baseband signal. The communication unit 202 also modulates a high frequency signal according to a baseband signal, converts the output thereof to a radio frequency, and outputs the resultant radio frequency signal to the antenna 201. The communication control unit 203 generates a baseband signal and outputs the generated baseband signal to the communication unit 202, and the communication unit 202 receives the output baseband signal.

In this way, the communication control unit 203, the communication unit 202 and the antenna 201 perform transmission/reception of information with the bank server apparatus 100 via the radio base station 40, the mobile phone network 30 and the Internet 20.

(2) Input Unit 207 and Display Unit 208

The input unit 207 receives an instruction from the user of the mobile phone 200, and outputs the received instruction to the control unit 206.

The display unit 208 displays various information under the control of the control unit 206.

(3) Input/Output Unit 209

When the memory card 300 is mounted in the mobile phone 300, the input/output unit 209 performs transmission/reception of information between the control unit 206 and the memory card 300 under the control of the control unit 206.

(4) Control Unit 206

(Output of a Connection Instruction)

Upon receiving a connection instruction from the user via the input unit 207, the control unit 206 outputs the connection instruction to the memory card 300 via the input/output unit 209. Furthermore, control unit 202 outputs the connection instruction to the bank server apparatus 100 via the communication control unit 203, the communication unit 202, the antenna 201, the radio base station 40, the mobile phone network 30 and the Internet 20.

(Relay of Information)

After outputting the connection instruction, the control unit 206 relays transmission/reception of information between the memory card 300 and the bank server apparatus 100.

Specifically, the control unit 206 relays transmission/reception of various information between the bank server apparatus 100 and the memory card 300 when the bank server apparatus 100 and the memory card 300 perform mutual authentication and key sharing.

Furthermore, upon receiving a user ID from the memory card 300, the control unit 206 transmits the received user ID to the bank server apparatus 100.

Upon receiving a type, amount information and amount signature data from the memory card 300, the control unit 206 transmits the received type, amount information and amount signature data.

Upon receiving electronic money and electronic money signature data from the bank server apparatus 100, the control unit 206 transmits the received electronic money and electronic signature data to the memory card 300.

(Reception of Information from the Bank Server Apparatus 100 and the Memory Card 300)

After the bank server apparatus 100 and the memory card 300 have performed mutual authentication and key sharing, the control unit 206 receives either success or failure notification showing the result of mutual authentication from the bank server apparatus 100, and receives either success or failure notification showing the result of mutual authentication from the memory card 300. When failure notification is received from at least one of the bank server apparatus 100 and the memory card 300, the control unit 206 outputs a message to that effect which it has displayed by the display unit 208, and then ends the processing. When success notification is received from both the bank server apparatus 100 and the memory card 300, the control unit 206 continues the processing.

If the user ID search result received from the bank server apparatus 100 is that the user ID does not exist in the user information table 121, the control unit 206 receives error notification showing that the user ID does not exist in the user information 121. On receiving the error notification, the control unit 206 outputs a message to that effect which it has displayed by the display unit 208, and then ends the processing.

Furthermore, the control unit 206 receives amount screen information from the bank server apparatus 100. On receiving the amount screen information, the control unit 206 generates an amount screen in accordance with the received amount screen information, and outputs the generated amount screen which it has displayed by the display unit 208. The control unit 206 then receives amount information and an electronic money type from the input unit 207, and outputs the received amount information and electronic money type to the memory card 300 via the input/output unit 209.

If verification of the amount signature data fails, the control unit 206 receives, from the memory card 300, failure information that is an amount signature data verification result and shows that verification has failed. On receiving the failure notification, the control unit 206 outputs a message to that effect which it has displayed by the display unit 208, and then ends the processing.

If verification of the electronic money signature data fails, the control unit 206 receives failure information that is an electronic money signature data verification result and shows that verification has failed. On receiving the failure notification, the control unit 206 outputs a message to that effect which it has displayed by the display unit 208, and then ends the processing.

The control unit 206 also receives a password request showing a request to input a first password from the memory card 300. Here, the first password is, for instance, a four digit number that has been arbitrarily set by the user. On receiving the password request, the control unit 206 outputs a message to that effect which it has displayed by the display unit 208, and receives the first password from the input unit 207. The control unit 206 then subjects the received first password an encryption algorithm, thereby generating a first encrypted password, and outputs the generated first password to the memory card 300 via the input/output unit 209.

1.4 Structure of the Memory Card 300

Figure 5:
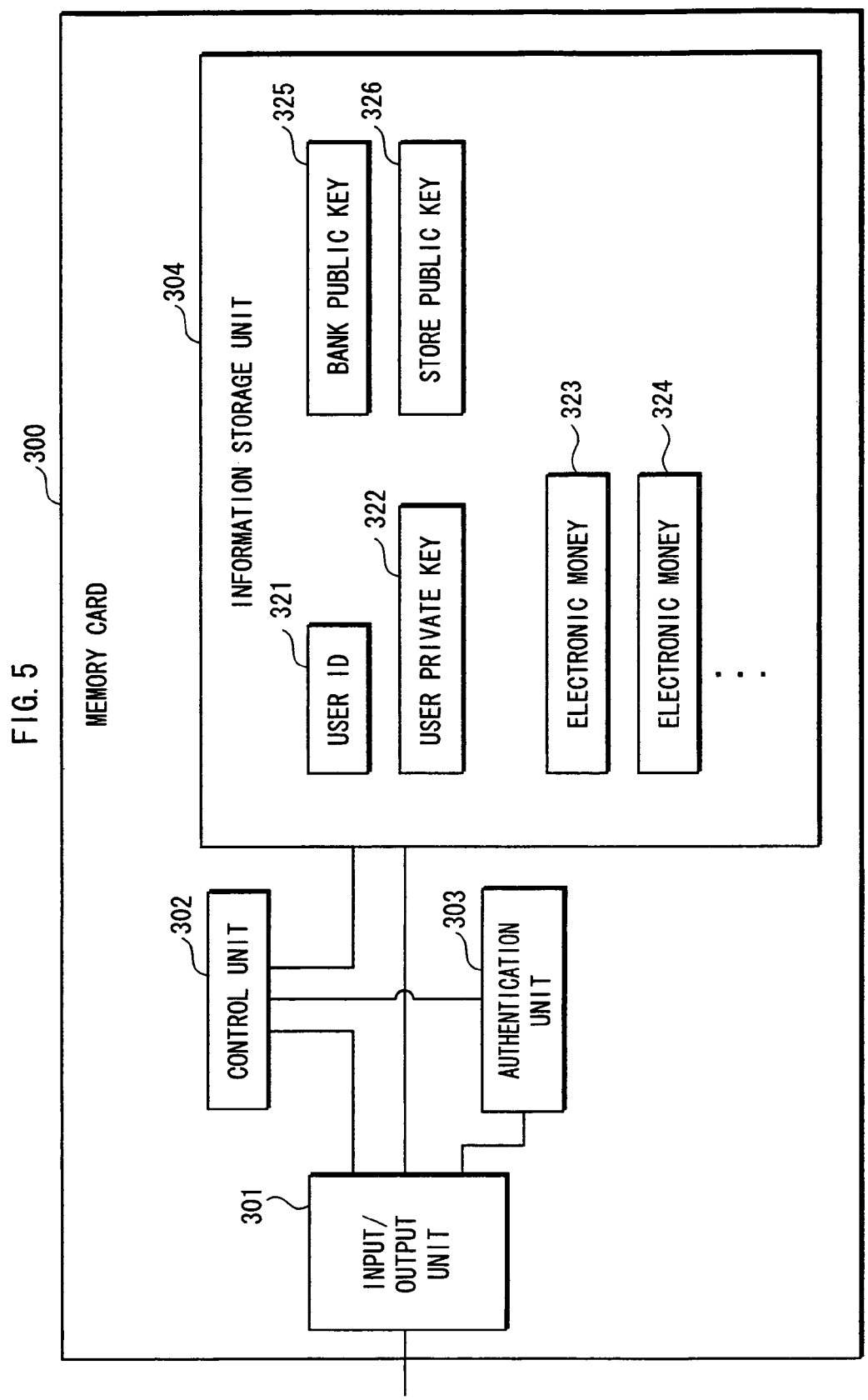
FIG. 5 is a block diagram showing the structure of a memory card 300.

The memory card 300 is a resin plate of 32 mm in length, 24 mm in width and 2.1 mm in thickness, that has an IC chip sealed therein. As shown in FIG. 5, the memory card 300 is composed of an input/output unit 301, a control unit 302, an authentication unit 303, and an information storage unit 304. The memory card 300 is an electronic purse apparatus that stores and manages electronic money.

The memory card 300 is a computer system specifically composed of a microprocessor, a ROM, a RAM, and the like. Computer programs are stored in the RAM. The memory card 300 achieves its functions by the microprocessor operating in accordance with the computer programs.

The memory card 300 is mounted in either of the mobile phone 200 and the register apparatus 400 by the user.

The following describes each compositional elements of the memory card 300.

(1) Information Storage Unit 304

As shown in FIG. 5, the information storage unit 304 stores a user ID 321, a user private key 322, a bank public key 325, and a store public key 326, and has an area for storing electronic money 323, 324 . . . .

The user ID 321 is identification information for identifying the user of the memory card 300.

The user private key 322 is a private key allocated to the memory card 300, and is key data of 160 bits in length. The bank public key 325 is a public key allocated to the bank server apparatus 100, and the store public key 326 is a public key allocated to the register apparatus 400. The bank public key 325 and the store public key 326 are each key data of 160 bits in length.

The bank public key 325 is a public key generated based on a public key generation algorithm using a bank private key as a basis. Similarly, the store public key 326 is a public key generated using a store private key as a basis. Here, the public key generation algorithm is based on elliptic curve encryption. Since elliptic curve encryption is commonly known, a detailed description thereof is omitted here.

Each of the electronic money 323, 324 . . . is cash-type electronic money or signature-type electronic money as described earlier.

An example of the cash-type electronic money stored in the information storage unit 304 is that shown in FIG. 3D. Such cash-type electronic money is composed of an identification flag "0", an electronic money ID "0x00", an amount "10000", and first authenticator "0x0000" and a second authenticator "0x0000".

An example of the signature-type electronic money stored in the information storage unit 304 is, as shown in FIG. 3B, composed of an identification flag "1", an electronic money ID "0x0F", an amount "10000", a first authenticator "E1 (PW1,1∥0 x0F∥0000", and a second authenticator "blank". Here, the identification flag, the electronic money ID, the amount and the second authenticator are as described earlier. The first authenticator is described below.

Here, "E1(A,B)" is a cipher text obtained by subjecting data B to an encryption algorithm E1 with use of a key A. "C∥D" shows concatenation of data C and data D in the stated order. One example of the encryption algorithm E1 is an encryption algorithm conforming to DES (Data Encryption Standard).

(2) Authentication Unit 303

The authentication unit 303 performs mutual device authentication via the input/output unit 301 with an external apparatus in which the memory card 300 is mounted, according to an instruction from the control unit 302, and also performs key sharing if the mutual device authentication succeeds. A session key is generated as a result of the key sharing. Here, the external apparatus is either of the bank server apparatus 100 and the register apparatus 400.

The authentication unit 303 outputs an authentication result showing a result of the mutual device authentication, in other words, whether the mutual device authentication has succeeded or failed, to the control unit 302. In the case of a session key being generated, the authentication unit 303 further outputs the generated session key to the control unit 302.

Note that the device authentication is challenge-response authentication. Since challenge-response authentication is commonly known, a detailed description thereof is omitted here. Furthermore, since key sharing is commonly known, a detailed description thereof is omitted here.

(3) Input/Output Unit 301

Upon the memory card 300 being mounted in the external apparatus, the input/output unit 301 detects that the memory card 300 has been mounted in the external apparatus. Upon detecting the mounting, the input/output unit 301 notifies the control unit 302 by sending detection information showing detection of mounting thereto. At this time, the input/output unit 301 receives device information showing the external apparatus type. Here, the device information shows one of the mobile phone 200 and the register apparatus 400.

Furthermore, when the memory card 300 is mounted in the external apparatus, the input/output unit 301 performs transmission/reception of information between the external apparatus and the control unit 302, between the external apparatus and the authentication unit 303, and between the external apparatus and the information storage unit 304.

(4) Control Unit 302

The control unit 302 receives, from the input/output unit 301, detection information showing the detection of the mounting, and further receives device information showing the external apparatus type. The control unit 302 then judges which of the mobile phone 200 and the register apparatus 400 is shown by the received device information.

(a) Acquisition of Electronic Money

When the received device information is judged to show the mobile phone 200, the control unit 302 further receives a connection instruction showing connection with the bank server apparatus 100, from the mobile phone 200.

On receiving the connection instruction, the control unit 302 instructs the authentication unit 303 to perform mutual device authentication and key sharing with the bank server apparatus 100. Next, the control unit 302 receives the mutual authentication result from the authentication unit 303, and in the case that mutual authentication has succeeded, also receives a session key. Here, the mutual authentication result shows either of success or failure of authentication. The control unit 302 outputs the mutual authentication result to the mobile phone 200 via the input/output unit 301.

In the case of the mutual authentication result showing failure, the control unit 302 ends the electronic money acquisition processing.

In the case of the mutual authentication result showing success, the control unit 302 reads the user ID 321 from the information storage unit 304, and transmits the read user ID 321 to the bank server apparatus 100 via the input/output unit 301, the mobile phone 200, the radio base station 40, the mobile phone network 30 and the Internet 20.

Next, the control unit 302 receives the type of the electronic money to be obtained and amount information showing the amount of the electronic money, from the mobile phone 200 via the input/output unit 301, and temporarily stores the received electronic money type and amount information internally. Next, the control unit 302 reads the user private key 322 from the information storage unit 304, and subjects the received amount information to a digital signature with use of the read user private key 322, thereby generating amount signature data. Next, the control unit 302 transmits the received type and amount information and the generated amount signature data to the bank server apparatus 100 via the input/output unit 301, the mobile phone 200, the radio base station 40, the mobile phone network 30 and the Internet 20.

Furthermore, the control unit 302 receives electronic money and electronic money signature data from the bank server apparatus 100 via the Internet 20, the mobile phone network 30, the radio base station 40, the mobile phone 200 and the input/output unit 301. The control unit 302 then reads the bank public key 325 from the information storage unit 304, and subjects the received electronic money and electronic money signature data to digital signature verification with use of the read bank public key 325, there by obtaining verification information. The verification result shows either of success or failure in verification. In the case of the verification result showing failure, the control unit 302 outputs failure notification showing failure, to the mobile phone 200 via the input/output unit 301. In the case of the verification result showing success, the control unit 301 writes the received electronic money to the information storage unit 304.

Next, the control unit 302 extracts the identification flag from the received electronic money, and judges which of "0" and "1" is shown by the identification flag. In the case of the identification flag being "0", the electronic money is cash-type, and therefore the control unit 302 ends the electronic money acquisition processing.

In the case of the identification flag being "1", the electronic money is signature-type, and therefore the control unit 302 makes a request, to the mobile phone 200 via the input/output unit 301, for input of the first password.

Next, the control unit 302 receives the first encrypted password from the mobile phone 200, and decrypts the received first encrypted password, thereby generating a first decrypted password. The control unit 302 extracts the identification amount, the electronic money ID and the amount from the received electronic money, bit concatenates the extracted identification amount, electronic money ID and amount in the stated order, thereby generating a concatenated entity, and subjects the generated concatenated entity to an encryption algorithm E1 using the generated first decrypted password as a key, thereby generating a first authenticator.

first authenticator Sign1=E1(first decrypted password, identification flag‖electronic money ID‖amount)

Next, the control unit 302 overwrites the electronic money in the information storage unit 304 to include the generated first authenticator.

In this way, the electronic money received from the bank server apparatus 100 is written to the information storage unit 304. At this time, in the case of the received electronic money being cash-type, the received electronic money is stored as is to the information storage unit 304. In the case of the received electronic money being signature-type, the first authenticator in the received electronic money is rewritten with the first authenticator generated as described above.

(b) Usage of Electronic Money

When the received device information is judged to show the register apparatus 400, the control unit 302 instructs the authentication unit 303 to performs mutual device authentication and key sharing with the register apparatus 400. The control unit 302 then receives a mutual authentication result from the authentication unit 303, and also receives a session key in the case that mutual authentication has succeeded. Here, the mutual authentication result shows either success or failure in authentication.

In the case of the mutual authentication result showing failure, the control unit 302 ends the electronic money usage processing.

On the other hand, in the case of the mutual authentication result showing success, the control unit 302 outputs, to the register apparatus 400 via the input/output unit 301, success notification showing that the mutual authentication result is success. The control unit 302 also reads the user ID 321 from the information storage unit 304, and transmits the read user ID 321 to the register apparatus 400 via the input/output unit 301.

Next, the control unit 302 receives a sale amount and sale amount signature data from the register apparatus 400 via the input/output unit 301. The sale amount is remuneration for a product that the user has purchased or a service that the user has been provided with by the store. The sale amount signature data is signature data generated with respect to the sale amount. Details of how the sale amount signature data is generated are given later.

Next, the control unit 302 reads the store public key 326 from the information storage unit 304, and subjects the received sale amount and sale amount signature data to digital signature verification with use of the read store public key 326, thereby obtaining a verification result. The verification result shows either success or failure in verification. In the case of the verification result showing failure, the control unit 302 outputs failure notification showing failure, to the register apparatus 400 via the input/output unit 301.

In the case of a verification result showing success, the control unit 302 temporarily stores the received sale amount, and then searches the information storage unit 304 for electronic money that includes an amount that is the same as the amount shown by the sale amount. When electronic money that includes the same amount does not exist, the control unit 302 outputs a search result to that effect to the register apparatus 400 via the input/output unit 301.

When electronic money that includes the same amount does exist, the control unit 302 extracts the identification flag from the electronic money, and judges which of "0" and "1" is shown by the extracted identification flag.

When the extracted flag is judged to show "0", in other words when the electronic money is cash-type, the control unit 302 generates electronic money signature data with respect to the electronic money as described later, and outputs the electronic money and the electronic money signature data to the register apparatus 400 via the input/output unit 301.

When the extracted flag is judged to show "1", in other words when the electronic money is signature-type, the control unit 302 makes a request to the register apparatus 400 for input of the second password, then receives the second encrypted password from the register apparatus 400, and decrypts the received second encrypted password, thereby generating a second decrypted password PW2. Next, from the electronic money that includes the same amount as the received sale amount, the control unit 302 extracts the identification flag, the electronic money ID and the amount, and bit concatenates the extracted identification flag, electronic money ID and amount in the stated order, thereby obtaining a concatenated entity. The control unit 302 then subjects the generated concatenated entity to the encryption algorithm E1 with use of the generated second encrypted password PW2, thereby generating a second authenticator Sign2.

second authenticator Sign2=E1 (second decrypted password PW2, identification flag‖electronic money ID‖amount)

Next, the control unit 302 overwrites in the electronic money in the information storage unit 304 so that the second authenticator therein in the generated second authenticator.

Here, an example of the electronic money that includes the newly written second authenticator is shown in FIG. 3C. The second authenticator in the electronic money 503 shown in FIG. 3C is E1(PW2,1||0x0F||10000).

Next, the control unit 302 extracts the first authenticator and the second authenticator from the electronic money, and judges whether or not the extracted first authenticator and the extracted second authenticator match each other. When the two do not match, the control unit 302 further performs a search of other electronic money.

When the two match, the control unit 302 sets the identification flag of the electronic money as "0", the electronic money ID as "0x00", the first authenticator as "0x0000", and the second authenticator as "0x0000". An example of the rewritten electronic money is shown in FIG. 3D. Next, the control unit 302 reads the user private key 322 from the information storage unit 304, and with use of the read user private key 322 subjects the electronic money whose identification flag, electronic money ID, first authenticator and second authenticator have been rewritten as described to a digital signature, thereby generating electronic money signature data. The control unit 302 outputs the rewritten electronic money and the generated electronic money signature data to the register apparatus 400 via the input/output unit 301.

Next, the control unit 302 deletes the stored electronic money from the information storage unit 304.

1.5 Structure of the Register Apparatus 400

Figure 6:
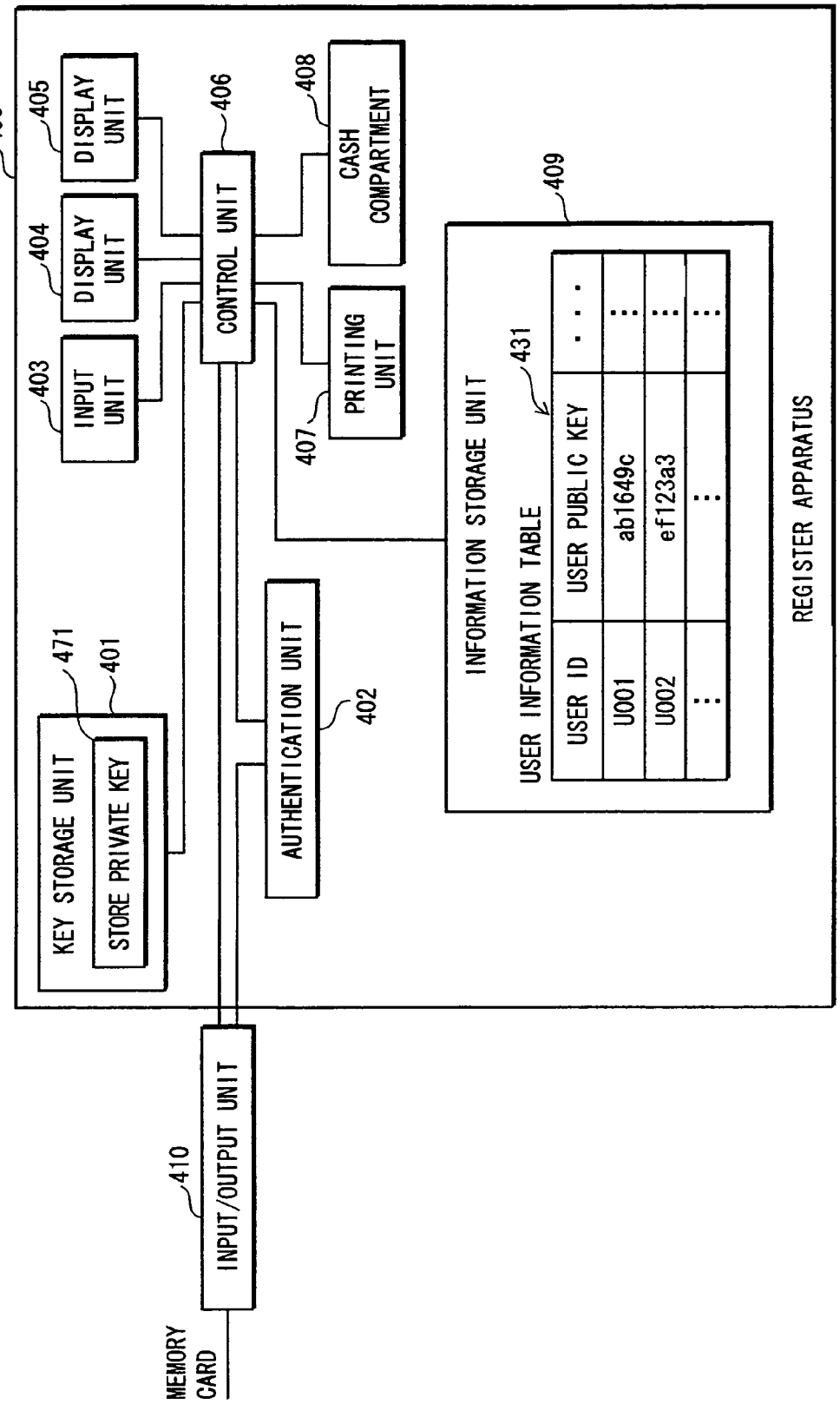
FIG. 6 is a block diagram showing the structure of a register apparatus 400.

The register apparatus 400 is a cash register that has functions such as performing account settlement of payment from a user, and safe-keeping the currency used for payment. As shown in FIG. 6, the register apparatus 400 is composed of a key storage unit 401, an authentication unit 402, an input unit 403, a display unit 404, a display unit 405, a control unit 406, a printing unit 407, a cash compartment 408, an information storage unit 409, and an input/output unit 410.

The register apparatus 400 is a computer system composed specifically of a microprocessor, a ROM, a RAM, a display unit, a keyboard, and the like. Computer programs are stored in the ROM. The register apparatus 400 achieves its functions by the microprocessor operating in accordance with the computer programs.

(1) Key Storage Unit 401

The key storage unit 401 is provided such that it cannot be accessed from outside, and, as shown in FIG. 6, the key storage unit 401 stores a store private key 471.

The store private key 471 is a private key allocated to the register apparatus 400, and is key data that is 160 bits in length.

(2) Information Storage Unit 409

The information storage unit 409 stores a user information table 431 as shown in FIG. 6.

The user information table 132 is composed of a plurality of pieces of user information, each of which corresponds to a different user.

Each piece of user information is composed of a user ID, a user public key and other information. The user ID is identification information for identifying a user. The user public key is a public key allocated to the memory card of the user, and is key data of 160 bits in length. The user public key is a public key generated based on the public key generation algorithm using the user private key as a basis.

(3) Authentication Unit 402

When the memory card 300 is mounted in the input/output unit 410 of the register apparatus 400, the authentication unit 402 performs mutual device authentication with the memory card via the input/output unit 410 under the control of the control unit 406, and when the mutual device authentication succeeds, further performs key sharing. A session key is generated as a result of this key sharing. Here, the device authentication is challenge-response authentication. Since challenge-response authentication is commonly known, a detailed description thereof is omitted here.

The authentication unit 402 outputs an authentication result showing a result of the mutual device authentication, in other words, showing success or failure in mutual device authentication, to the control unit 406. When a session key has been generated, the authentication unit 402 further outputs the generated session key to the control unit 406.

(4) Input/Output Unit 410

The input/output unit 410 has a connection unit in which the memory card 300 is mounted, and a numeric key pad composed of a plurality of keys on which numbers 0 to 9 and so on are inscribed. The input/output unit 410 is a device that is independent from the register apparatus 400, and is connected via a cable 411 to the control unit 406 and the authentication unit 402 of the register apparatus 400.

The memory card 300 is mounted in the input/output unit 410 by the user.

Upon mounting of the memory card 300 being detected, the input/output unit 410 outputs detection information showing the detection, to the control unit 406.

The input/output unit 410 performs transmission/reception of information bi-directionally between the control unit 406 and the memory card 300 under the control of the control unit 406, and between the authentication unit 402 and the memory card 300 under the control of the authentication unit 402.

Furthermore, the input/output unit 410 receives input of a password according to a user operation of the numeric keys, and outputs the received password to the control unit 406.

(5) Control Unit 406

The control unit 406 receives input of a sale amount from an operator of the register apparatus 400. Next, the control unit 406 receives detection information showing detection of mounting of the memory card 300 from the input/output unit 410.

On receiving the detection information, the control unit 406 controls the authentication unit 402 so as to perform mutual device authentication and key sharing with the memory card 300. Next, the control unit 406 receives an authentication result from the authentication unit 402. In the case of the authentication result showing failure, the control unit 406 outputs a message showing authentication failure to the display unit 404 and the display unit 405, and instructs the display unit 404 and the display unit 405 to display the message. The control unit 406 then ends the electronic money usage processing.

In the case of the authentication result showing that device authentication with the memory card 300, the control unit 406 receives success notification from the memory card 300 via the input/output unit 410.

When the authentication result received from the authentication unit 402 shows success, but success notification is not received from the memory card 300 within a predetermined period of time from when device authentication takes place, the control unit 406 considers the device authentication to have failed, and outputs a message showing authentication failure to the display unit 404 and the display unit 405, and instructs the display units 404 and 405 to display the message. The control unit 406 then ends the electronic money usage processing.

When the authentication result received from the authentication unit 402 shows success and success notification is received from the memory card 300 within the predetermined period from when the device authentication takes place, the control unit 406 further receives the user ID from the memory card 300.

Next, the control unit 406 reads the store private key 471 from the key storage unit 401, and with use of the read store private key 471, subjects the sale amount of which input was received to a digital signature, thereby generating sale amount signature data. The control unit 406 then outputs the sale amount of which input was received and the generated sale amount signature data to the memory card 300 via the input/output unit 410.

When failure notification showing that the result of sale amount signature data verification is failure is received from the memory card 300 within a predetermined time period from when the sale amount and the sale amount signature data have been output to the memory card 300, the control unit 406 outputs a message to that effect to the display unit 404 and the display unit 405, and instructs the display unit 404 and the display unit 405 to display the message. The control unit 406 then ends the electronic money usage processing.

When such failure notification is not received from the memory card 300 within a predetermined time period from when the sale amount and the sale amount signature data have been output to the memory card 300, and additionally when an electronic money search result is received and the electronic money search result shows that electronic money does not exist, the control unit 406 outputs a message to that effect to the display unit 404 and the display unit 405, and instructs the display unit 404 and the display unit 405 to display the message. The control unit 406 then ends the electronic money usage processing.

When a search result is not received, or when the received search result shows that electronic money exists, the control unit 406 further receives the second password from the memory card 300, instructs the input/output unit 410 to receive input of the second password, and receives the second password from the input/output unit 410. Next, the control unit 406 encrypts the received second password, thereby generating a second encrypted password, and outputs the generated second encrypted password to the memory card 300 via the input/output unit 410.

The control unit 406 receives electronic money and electronic money signature data from the memory card 300 via the input/output unit 410, reads the piece of user information that includes the received user ID from the user information table 431, and extracts the user public key from the read user information. Next, the control unit 406 subjects the received electronic money and electronic money signature data to digital signature verification using the extracted user public key. In the case that verification fails, the control unit 406 outputs a message to that effect to the display unit 404 and the display unit 405, and instructs the display unit 404 and the display unit 405 to display the message. Then control unit 406 then ends the electronic money usage processing.

In the case the verification succeeds, the control unit 406 writes the received electronic money to the information storage unit 409, and performs sale account settlement processing using the received electronic money.

(8) Input Unit 403, Display Unit 404, Display Unit 405, Printing Unit 407 and Cash Compartment 408

The input unit 403 receives input of various information from the operator of the register apparatus 400, and outputs the received input to the control unit 406. The display unit 404 and the display unit 405 receive information to the displayed from the control unit 406, and display the received information.

The printing unit 407 prints various information under the control of the control unit 406.

The cash compartment 408 safe-keeps bills, coins and so on.

1.6 Operations of the Electronic Money Usage System 10

The following describes operations of the electronic money usage system 10, and in particular operations when acquiring electronic money and operations when using electronic money.

(1) Operations for Electronic Money Acquisition

Figure 7:
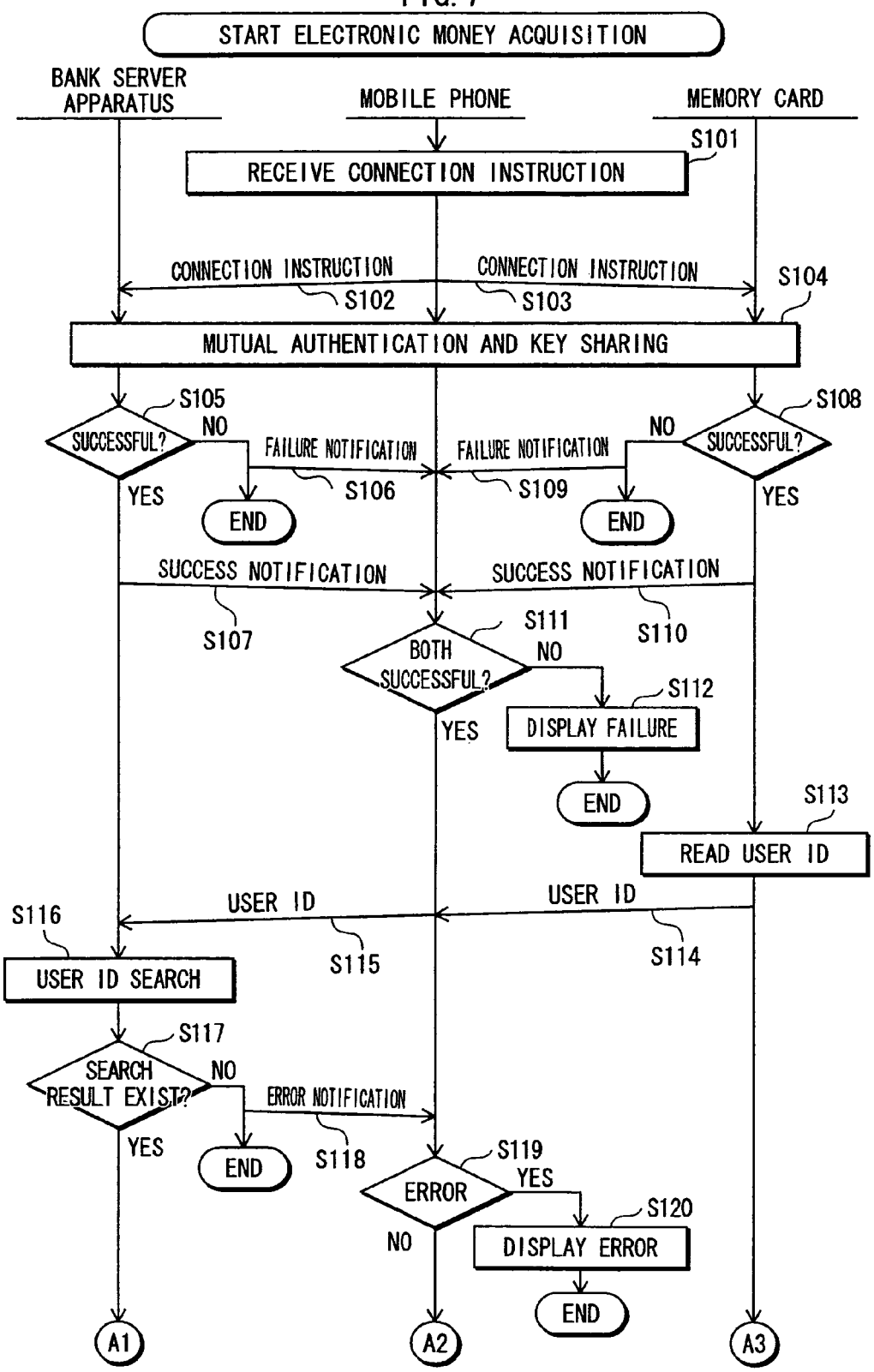
FIG. 7 is a flowchart showing operations for electronic money acquisition in the electronic money usage system 10, and continues in FIG. 8.
Figure 8:
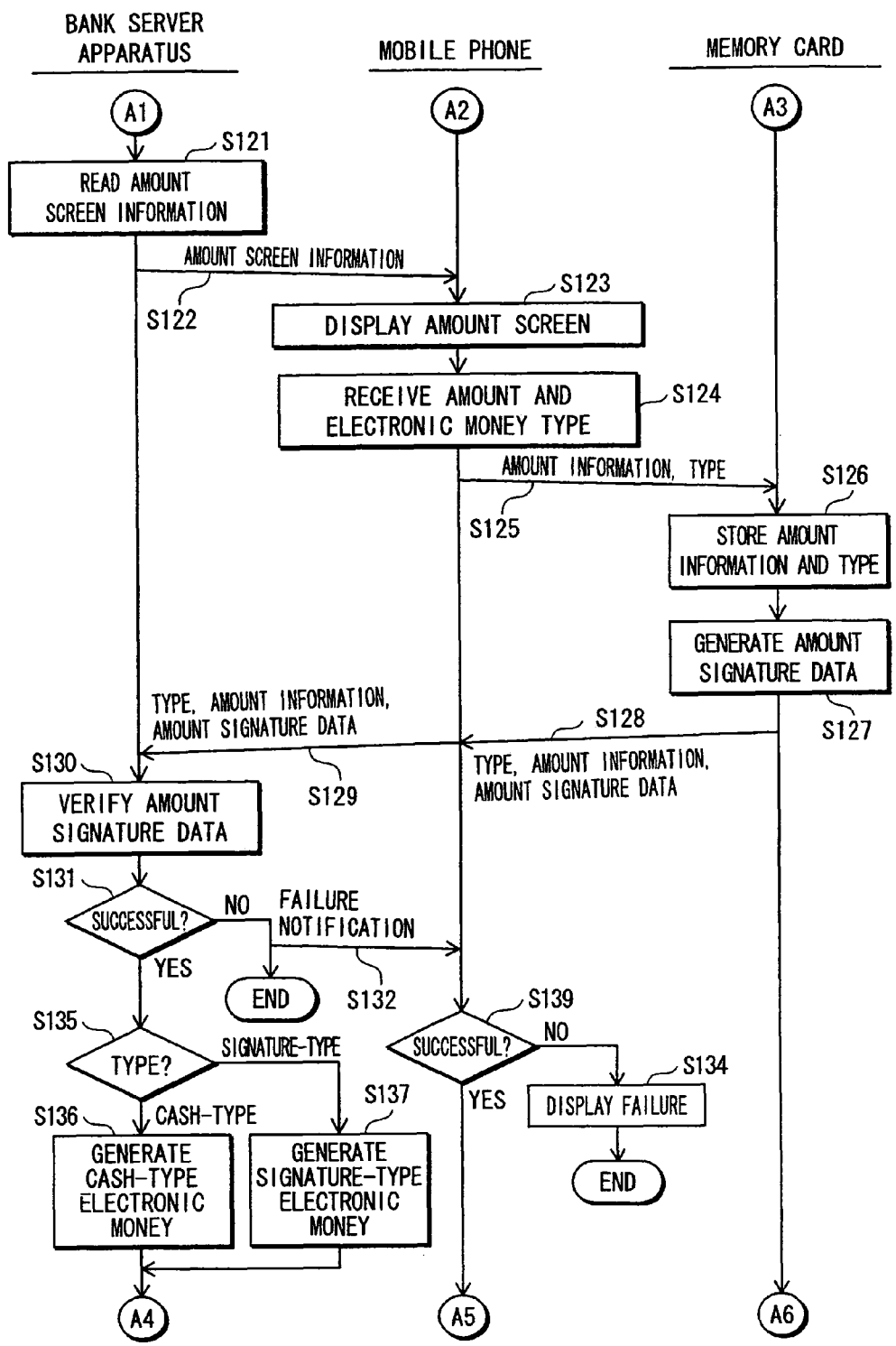
FIG. 8 is a flowchart showing operations for electronic money acquisition in the electronic money usage system 10, and continues in FIG. 9.
Figure 9:
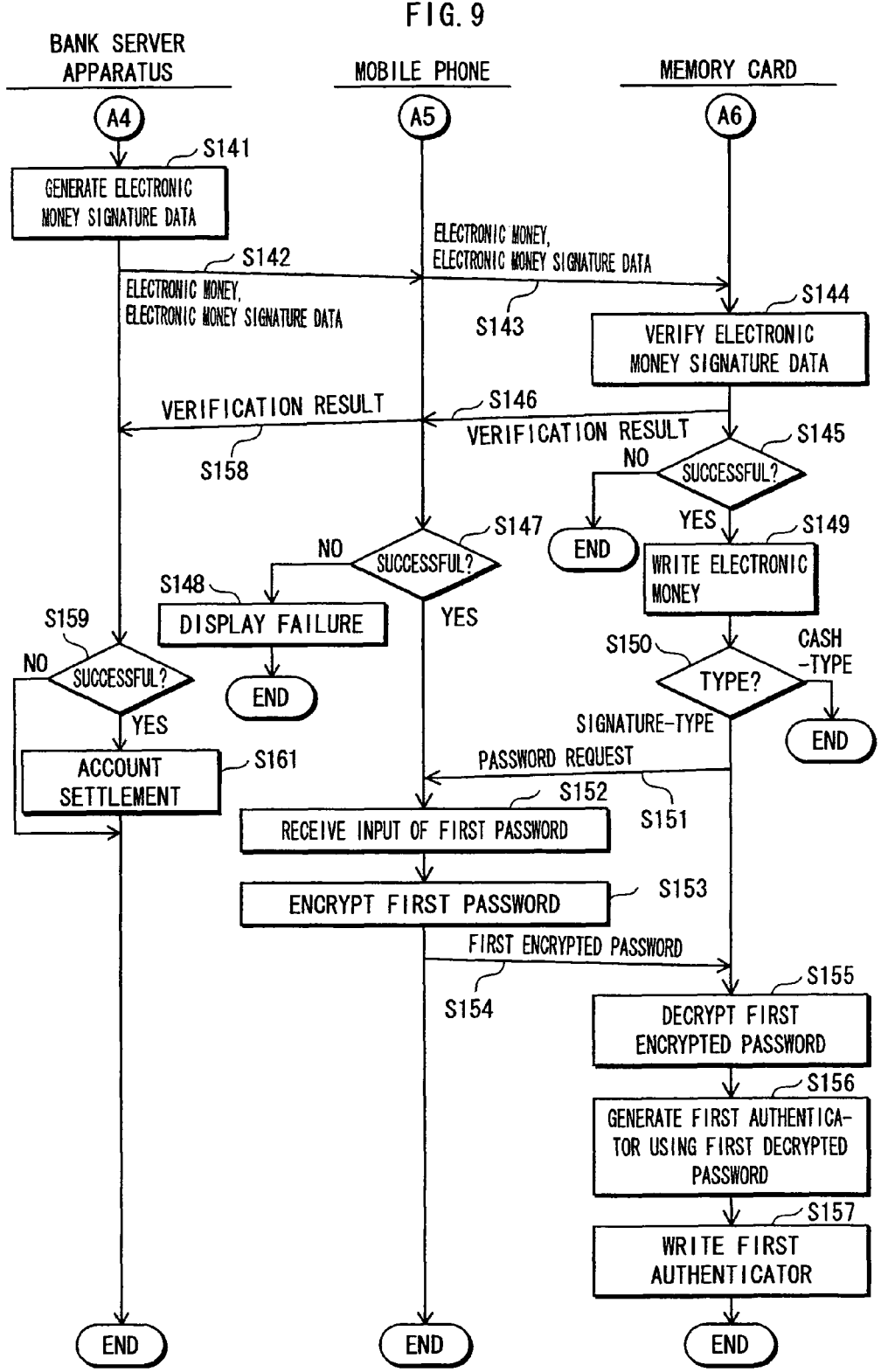
FIG. 9 is a flowchart showing operations for electronic money acquisition in the electronic money usage system 10, and continues from FIG. 8.

The following describes operations for electronic money acquisition in the electronic money usage system 10, with reference to the flowcharts shown in FIG. 7 to FIG. 9.

The input unit 207 of the mobile phone 200 receives a connection instruction from the user (step S101), and the control unit 206 outputs the connection instruction to the bank server apparatus 100 via the communication control unit 203, the communication unit 202, the antenna 201, the radio base station 40, the mobile phone network 30, and the Internet 20 (step S102). The control unit 206 also outputs the connection instruction to the memory card 300 via the input/output unit 209 (step S103).

The authentication unit 106 of the bank server apparatus 100 and the authentication unit 303 of the memory card 300 perform mutual device authentication and key sharing (step S104).

When the authentication unit 106 fails in authentication (step S105), the control unit 101 notifies the mobile phone 200 of the failure (step S106), and then ends the operations for electronic money acquisition. When the authentication unit 106 succeeds in authentication (step S105), the control unit 101 notifies the mobile phone 200 of the success (step S107).

When the authentication unit 303 fails in authentication (step S108), the control unit 302 notifies the mobile phone 200 of the failure (step S109), and then ends the operations for electronic money acquisition. When the authentication unit 303 succeeds in authentication (step S108), the control unit 302 notifies the mobile phone 200 of the success (step S110).

When the control unit 206 of the mobile phone 200 receives notice of authentication failure from at least one of the bank server apparatus 100 and the memory card 300 (step S111), the display unit 208 displays a message to the effect (step S112), and the control unit 206 ends subsequent electronic money acquisition processing.

When the authentication unit 303 succeeds in authentication (step S108), the control unit 302 reads the user ID 321 from the information storage unit 304 (step S113), and transmits the read user ID to the bank server apparatus 100 via the mobile phone 200 (step S114 to step S115).

When the authentication succeeds (step S105), the control unit 101 receives the user ID from the memory card 300 (steps S114 to S115), and searches the user information table 121 for a user ID that matches the received user ID (step S116). When the received user ID does not exist in the user information table 121 (step S117), the control unit 101 transmits a message to that effect to the mobile phone 200 (step S118), and ends the electronic money acquisition processing.

The control unit 206 of the mobile phone 200 receives a message (step S118), and when the received message is error notification (step S119), the display unit 208 displays a message to that effect (step S120), and the control unit 206 ends the processing.

When the received user ID exists in the user information table 121 (step S117), the control unit 101 reads the amount screen information 131 from the information storage unit 102 (step S121), and transmits the read amount screen information 131 to the mobile phone 200 (step S122).

Upon receiving the amount screen information from the bank server apparatus 100 (step S122), the control unit 206 generates an amount screen in accordance with the received amount screen information, and the display unit 208 displays the amount screen (step S123). The input unit 207 receives input of the amount information and the electronic money type (step S124), and outputs the received amount information and electronic money type to the memory card 300 via the input/output unit 209 (step S125).

Next, the control unit 302 receives the type and amount information from the mobile phone 200 (step S125), and temporarily stores the received type and amount information internally (step S126). Using the user private key 322, the control unit 302 subjects the received amount information to a digital signature, thereby generating amount signature data (step S127), and transmits the received type and amount information and the generated amount signature data to the bank server apparatus 100 (step S128 to step S129).

Next, the control unit 101 receives the type, the amount information and the amount signature data from the memory card 300 (steps S128 to S129), and using the user public key that corresponds to the received user ID, verifies the received amount signature data by subjecting the received amount information and amount signature data to a digital signature verification algorithm (step S130).

When verification fails (step S131), the control unit 101 transmits a message to that effect to the mobile phone 200 (step S132), and ends the electronic money acquisition processing.

The control unit 206 receives a message from the bank server apparatus 100 (step S132), and when the received message shows failure (step S133), the display unit 208 displays a message to that effect (step S134), and the control unit 206 ends the processing.

When verification succeeds (step S131), the control unit 101 judges which of cash-type and signature-type the acquired electronic money type is, and when the acquired electronic money type is judged to be cash-type (step S135), generates cash-type electronic money (step S136). When the acquired electronic money type is judged to be signature-type (step S135), the control unit 101 generates signature-type electronic money (step S137).

Next, the control unit 101 generates electronic money signature data by subjecting the generated cash-type or signature-type electronic money to a digital signature with use of the bank private key 141 read from the information storage unit 102 (step S141), and transmits the generated electronic money signature data and the generated cash-type or signature-type electronic data to the memory card 300 (step S142 to step S143).

Next, the control unit 302 receives the electronic money and the electronic money signature data from the bank server apparatus 100 (step S142 to step S143), subjects the received electronic money and electronic money signature data to digital signature verification with use of the bank public key 325 read from the information storage unit 304, and obtains verification result showing either success or failure of verification (step S144). The control unit 302 then outputs the verification result to the mobile phone 200 via the input/output unit 301 (step S146).

The control unit 206 receives the verification result (step S146), and transmits the received verification result to the bank server apparatus 100 (step S158).

The control unit 101 receives the verification result (step S158), and when the received verification result shows failure (step S159), the control unit 101 does nothing. When the received verification result shows success (step S159), the control unit 101 performs account settlement processing with the user of the memory card 300 based on the amount information received from the memory card 300. As one example, the amount shown by the amount information is deducted from the bank account of the user of the memory card 300 (step S161), and then the bank server apparatus 100 ends the electronic money provision processing.

The control unit 206 receives the verification result (step S146), and when the received verification result shows failure (step S147), the display unit 208 displays a message to that effect (step S148), and the control unit 206 ends the processing.

When the verification result shows failure (step S145), the control unit 302 ends the processing.

When the verification result shows success (step S145), the control unit 302 writes the received electronic money to the information storage unit 304 (step S149).

Next, the control unit 302 extracts the received electronic money identification flag, and judges which of "0" and "1" the identification flag is. The identification flag being "0" (step S150) means that that the electronic money is cash-type, and therefore the control unit 302 ends the electronic money acquisition processing.

The identification flag being "1" (step S150) means that the electronic money is signature-type, and therefore the control unit 302 makes a request to the mobile phone 200 for input of the first password (step S151).

Next, the control-unit 206 receives the password request from the memory card 300 (step S151), the display unit 208 displays a message to that effect, and the input unit 207 receives input of the first password (step S152). The control unit 206 subjects the received first password to an encryption algorithm, thereby generating a first encrypted password (step S153), and outputs the generated first encrypted password to the memory card 300 via the input/output unit 209 (step S154).

Next, the control unit 302 receives the first encrypted password from the mobile phone 200 (step S154), decrypts the received first encrypted password, thereby generating a first decrypted password (step S155). The control unit 302 then extracts the identification flag, the electronic money ID and the amount from the received electronic money, concatenates the extracted identification flag, electronic money ID and amount, thereby generating a concatenated entity, and subjects the generated concatenated entity to an encryption algorithm E1 with use of the generated first decrypted password, thereby generating a first authenticator (step S156). Next, the control unit 302 overwrites the electronic money written in the information storage unit 304 such that the first authenticator therein is the generated first authenticator (step S157).

(2) Operations for Using Electronic Money

Figure 10:
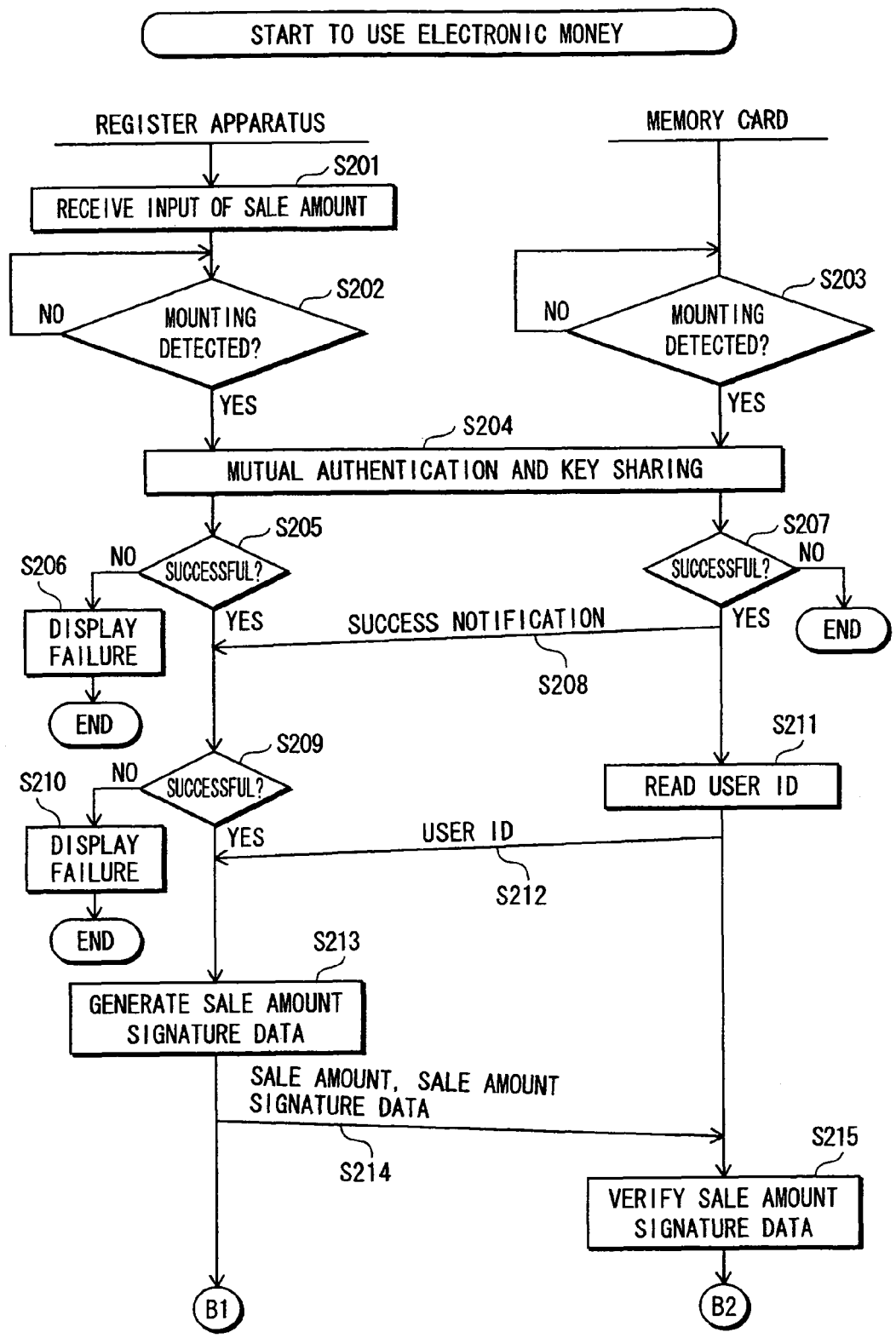
FIG. 10 is a flowchart showing operations for using electronic money in the electronic money usage system 10, and continues in FIG. 11.
Figure 11:
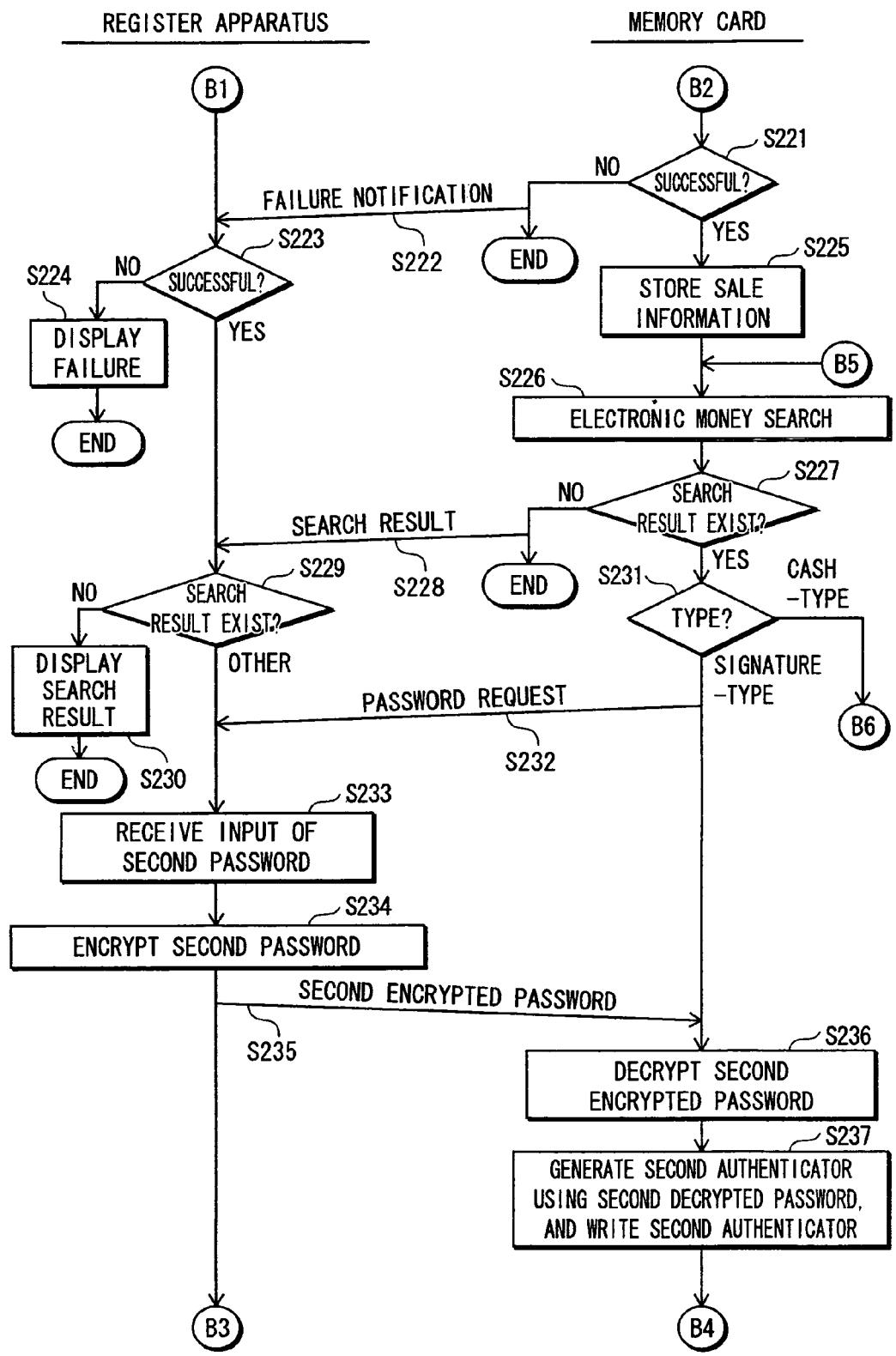
FIG. 11 is a flowchart showing operations for using electronic money in the electronic money usage system 10, and continues in FIG. 12.
Figure 12:
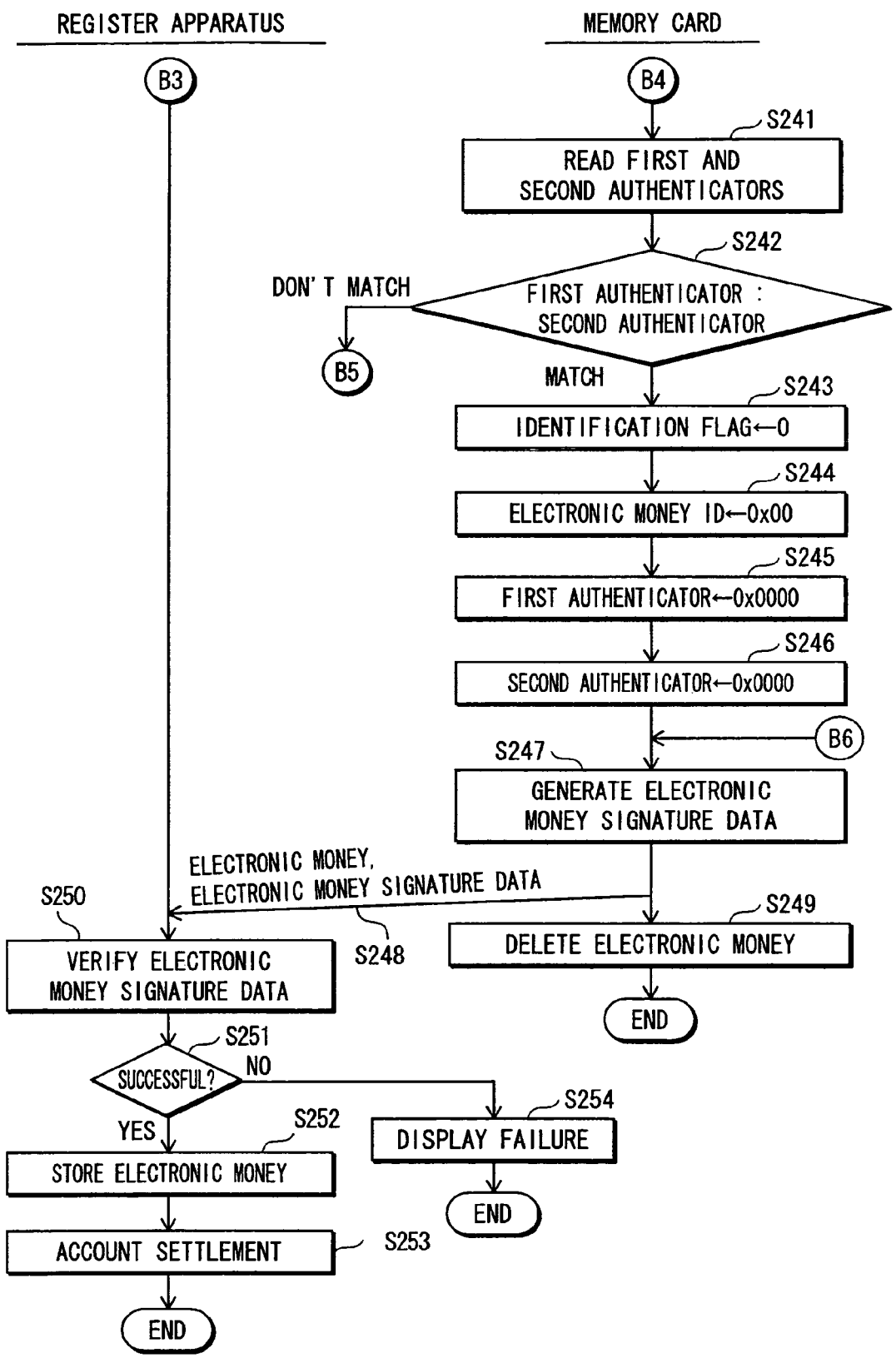
FIG. 12 is a flowchart showing operations for using electronic money in the electronic money usage system 10, and continues from FIG. 11.

The following describes operations for using electronic money in the electronic money usage system 10, with reference to the flowchart shown in FIG. 10 to FIG. 12.

The control unit 406 of the register apparatus 400 receives input of a sale amount from the operator of the register apparatus 400 (step S201), and then receives detection information from the input/output unit 410 showing detection of mounting of the memory card 300 (step S202). When the control unit 302 of the memory card 300 detects that the memory card 300 has been mounted in a register apparatus (step S203), the authentication unit 402 and the authentication unit 303 perform mutual device authentication and key sharing (step S204).

When the authentication unit 402 fails in device authentication (step S205), the display unit 404 and the display unit 405 display a message to that effect (step S206), and the control unit 406 ends the electronic money usage processing.

When the authentication unit 303 fails in device authentication (step S207), the control unit 302 ends the electronic money usage processing. When the authentication unit 303 succeeds in device authentication (step S207), the control unit 302 transmits notification of success to the register apparatus 400 (step S208).

When the authentication by the authentication unit 402 succeeds (step S205) and the control unit 406 receives a message showing failure from the memory card 300 (step S209), the display unit 404 and the display unit 405 display a message to that effect (S210), and the control unit 406 ends the electronic money usage processing.

When device authentication succeeds (step S207), the control unit 302 reads the user ID 321 from the information storage unit 304 (step S211), and outputs the read user ID to the register apparatus 400 (step S212).

When the authentication by the authentication unit 402 succeeds (step S205) and the message received from the memory card 300 shows success (step S209), the control unit 406 receives the user ID from the memory card 300 (step S212), and with use of the store private key 471 read from the key storage unit 401, subjects the sale amount of which input was received to a digital signature, thereby generating sale amount signature data (step S213). The control unit 406 then outputs the sale amount of which input was received and the generated sale amount signature data to the memory card 300 (step S214).

Next, the control unit 302 receives the sale amount and the sale amount signature data from the register apparatus 400 (step S214), and with use of the store public key 326 read from the information storage unit 304, subjects the received sale amount and sale amount signature data to digital signature verification, and obtains a verification result (step S215). When the verification result shows failure (step S221), the control unit 302 outputs failure notification showing failure, to the register apparatus 400 (step S222). When the control unit 406 receives the failure notification (step S223), the display unit 404 and the display unit 405 display a message to that effect (step S224), and the control unit 406 ends the electronic money usage processing.

When the verification result shows success (step S221), the control unit 302 temporarily stores the received sale amount (step S225), and searches the information storage unit 304 for electronic money that includes an amount the same as the amount shown by the sale amount (step S226). When money that includes the same amount does not exist (step S227), the control unit 302 outputs a search result to that effect to the register apparatus 400 (step S228), and then ends the electronic money usage processing. When a search result is received showing that electronic money that includes the same amount does not exist (step S229), the display unit 404 and the display unit 405 display a message to that effect (step S230), and then the control unit 406 ends the electronic money usage processing.

When electronic money that includes the same amount exists (step S227), the control unit 302 extracts the identification flag from that electronic money, and judges which of the "0" and "1" the extracted identification flag is. When the extracted identification flag is judged to be "0", in other words when the electronic money is cash-type (step S231), the control unit 302 moves the control to step S247.

When the extracted identification flag is "1", in other words when the electronic money is signature-type (step S231), the control unit 302 makes a request to the register apparatus 400 for input of a second password (step S232).

When a search result is not received, or when the received search result shows that the electronic money exists (step S229), the control unit 406 receives input of the second password from the memory card 300 (step S232), the input/output unit 410 receives input of the second password, and the control unit 406 receives the second password from the input/output unit 410 (step S233). The control unit 406 then encrypts the received second password, thereby generating a second encrypted password (step S234), and outputs the generated second encrypted password to the memory card 300 (step S235).

The control unit 302 receives the second encrypted password (step S235), and decrypts the received second encrypted password, thereby generating a second decrypted password PW2 (step S236). The control unit 302 then bit concatenates, in the stated order, the identification flag, electronic money ID and amount extracted from the electronic money that includes the amount the same as the received sale amount, thereby generating a concatenated entity, and subjects the generated concatenated entity to an encryption algorithm E1, thereby generating a second authenticator. The control unit 302 overwrites the electronic money written in the information storage unit 304 such that the second authenticator therein is the generated second authenticator (step S237).

Next, the control unit 302 extracts the first authenticator and the second authenticator from the electronic money (step S241), and judges whether or not the extracted first authenticator and the extracted second authenticator match each other (step S242). When the two are judged to not match (step S242), the control unit 302 returns to step S226 and repeats the processing.

When the two are judged to match (step S242), the control unit 302 rewrites electronic money such that the identification flag is "0" (step S243), the electronic money ID is "0x00" (step S244), the first authenticator is "0x0000" (step S245), and the second authenticator is "0x0000" (step S246). Next, with use of the user private key 322 read from the information storage unit 304, the control unit 302 subjects the electronic money whose identification flag, electronic money ID, first authenticator and second authenticator have been rewritten as above to a digital signature, thereby generating electronic money signature data (step S247), and outputs the rewritten electronic money and the generated electronic money signature data to the register apparatus 400 (step S248).

Next, the control unit 302 deletes the electronic money from the information storage unit 304 (step S249).

The control unit 406 receives the electronic money and the electronic money signature data from the memory card 300 (step S248), reads the piece of user information that includes the received user ID from the user information table 431, extracts the user public key from the read piece of user information, and subjects the received electronic money and electronic money signature data to digital signature verification with use of the extracted user public key (step S250). When verification fails (step S251), the display unit 404 and the display unit 405 display a message to that effect (step S254), and the control unit 406 ends the electronic money usage processing.

When verification is successful (step S251), the control unit 406 writes the received electronic money to the information storage unit 409 (step S252), and using the received electronic money, performs sale account settlement processing (step S253).

1.7 Conclusion

As has been described, in the electronic money usage system 10, the memory card 300 possessed by a user acquires signature-type or cash-type electronic money from the bank server apparatus 100 via the mobile phone 200. When the acquired electronic money is cash-type, the memory card 300 internally stores the acquired electronic money as is. When the acquired electronic money is signature-type, the memory card 300 receives the first password from the user via the mobile phone 200, generates a first authenticator with use of the first password and the identification flag, electronic money ID and amount included in the acquired electronic money, and writes the generated first authenticator in the electronic money.

When using the electronic money, the memory card 300 is mounted in the input/output unit 410 of the register apparatus 400.

When using cash-type electronic money stored in the memory card 300, the memory card 300 securely outputs the electronic money to the register apparatus 400, and the register apparatus 400 performs account settlement using the received electronic money.

When the electronic money stored in the memory card 300 is signature-type, the memory card 300 receives the second password from the user via the input/output unit 410 of the register apparatus 400, and using the second password and the identification flag, electronic money ID and amount included in the signature-type electronic money stored in the memory card 300, generates a second authenticator, and writes the generated second authenticator in the electronic money. Next, the memory card 300 compares the first authenticator and the second authenticator included in the electronic money. If the two match, the memory card 300 converts the signature-type electronic money to the same format as the cash-type electronic money, securely outputs the cash-type electronic money generated as a result of the conversion to the register apparatus 400, and the register apparatus 400 performs account settlement using the received electronic money.

In this way, when using the signature-type electronic money, the electronic money is output from the memory card 300 when, in the memory card 300, the first authenticator generated using the first password input by the user when acquiring the signature-type electronic money and the second authenticator generated using the second password input by the user when using the electronic money.

Here, if the user at the time of acquiring the electronic value and the user at the time of using the electronic value are the same person, identical first data and second data will be able to be provided, and therefore the first authenticator and the second authenticator will of course match.

However, if the memory card storing the signature-type electronic money is lost or stolen, a person that attempts to dishonestly use the signature-type electronic money stored in the memory card does not know the first password. Consequently, if a second password that is different to the first password is input via the input/output unit 410 of the register apparatus 400, the second authenticator that is generated as a result will not match the first authenticator generated using the first password, and therefore the memory card 300 does not output electronic money to the register apparatus 400.

In this way, signature-type electronic money can be protected from dishonest use.

2. Modifications

The following describes an electronic money usage system 10*a* (not illustrated) as an example of a modification the above preferred embodiment.

As with the electronic money usage system 10, the electronic money usage system 10*a* is composed of a bank server apparatus 100, a mobile phone 200, a memory card 300 and a register apparatus 400. The bank server apparatus 100, the mobile phone 200, the memory card 300 and the register apparatus 400 are composed of the same structure as the bank server apparatus 100, the mobile phone 200, the memory card 300 and the register apparatus 400 of the electronic money usage system 10.

The electronic money usage system 10*a* differs partly from the electronic money usage system 10 in terms of operations when acquiring electronic money. Furthermore, the electronic money usage system 10*a* differs partly to the electronic money usage system 10 in terms of operations when using electronic money. The following description focuses on these differences.

When acquiring electronic money in the electronic money usage system 10*a*, the same operations as steps S101 to s157 in FIGS. 7 to 9 are performed, but with a difference in the following step.

In step S156, the control unit 302 uses a digital signature algorithm S1 instead of the encryption algorithm E1. Here, as one example, the digital signature algorithm S1 is an elliptic curve ElGamal signature algorithm.

In other words, the control unit 302 extracts the identification flag, the electronic money ID and the amount from the received electronic money, and bit concatenates the extracted identification flag, electronic money ID and amount in the stated order, to generate a concatenated entity. The operations are the same as in the electronic money usage system 10 up to this point. Next, the control unit 302 subjects the first decrypted password to a hash function SHA-1, to generate a private key SK1.

SK1=SHA-1 (first decrypted password)

Since the hash function SHA-1 is commonly known, a description thereof is omitted here.

Next, the control unit 302 subjects the generated concatenated entity to the digital signature algorithm S1, using the generated private key SK1 as a key, to generate a first authenticator Sign1.

Sign1=S1 (SK1, identification flag∥electronic money ID∥amount)

When using electronic money in the electronic money usage system 10*a*, the same operations as steps S201 to s253 in FIGS. 10 to 12 are performed, but with a difference in the following step.

At step S237, the control unit 302 uses the digital signature algorithm S1 instead of the encryption algorithm E1.

In other words, the control unit 302 extracts the identification flag, the electronic money ID and the amount from the electronic money that includes the same amount as the received sale amount, and bit concatenates the extracted identification flag, electronic money ID and amount in the stated order, to generate a concatenated entity. The operations are the same as in the electronic money usage system 10 up to this point. Next, the control unit 302 subjects the second decrypted password to a hash function SHA-1, to generate a private key SK2.

SK2=SHA-1 (second decrypted password)

Next, the control unit 302 subjects the generated concatenated entity to the digital signature algorithm S1, using the generated private key SK2 as a key, to generate a second authenticator Sign2.

Sign2=S1 (SK2, identification flag∥electronic money ID∥amount)

Next, the control unit 302 generates a public key PK from the generated private key SK2. Note that one example of the generation method for the public key is commonly known in elliptical curve ElGamal signature, and therefore a description thereof is omitted.

Figure 13:
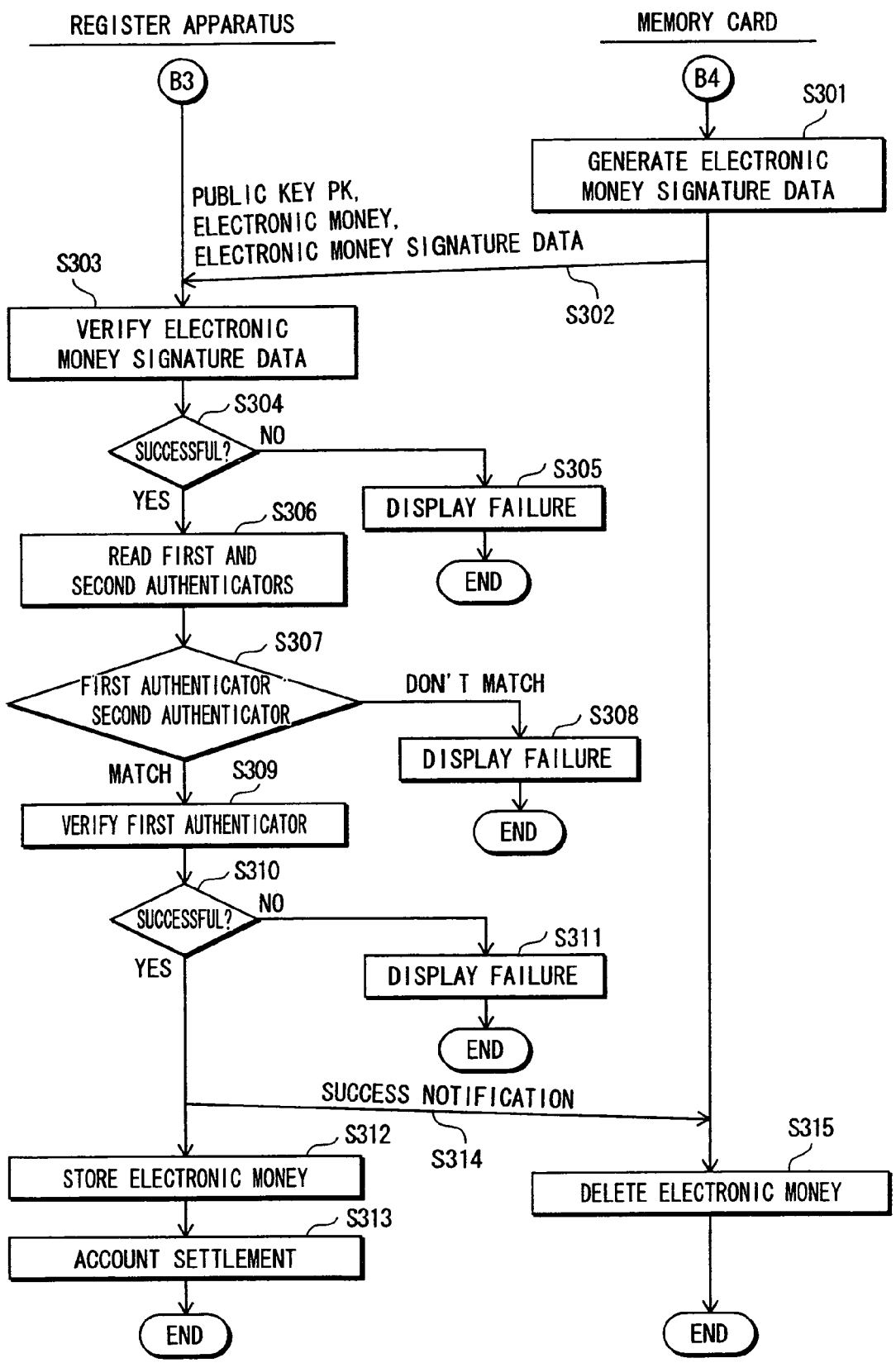
FIG. 13 is a flowchart showing operations for using electronic money in an electronic money usage system 10a that is a modification of the electronic money usage system 10.

Furthermore, in the operations when using electronic money in the electronic money usage system 10*a*, after the operations at step S237 have finished, the operations shown in the flowchart in FIG. 13 are performed instead of the operations at steps S241 to S253 in the flowchart shown in FIG. 12.

The control unit 302 of the memory card 300 generates electronic money signature data in the same way as in step S247 (step S301), and outputs the generated public key PK, the electronic money, and the generated electronic money signature data to the register apparatus 400 via the input/output unit 301 (step S302).

The control unit 406 of the register apparatus 400 receives the public key PK, the electronic money and the electronic money signature data via the input/output unit 410 from the memory card 300 (step S302), and performs verification of the electronic money signature data in the same way as step S250 (step S303). When verification fails (step S304), the control unit 406 instructs the display unit 404 and the display unit 405 to display a message to that effect, and the display unit 404 and the display unit 405 display the message (step S305). The electronic money usage processing then ends.

When verification succeeds (step S304), the control unit 406 reads the first authenticator and the second authenticator from the received electronic money (step S306), and then judges whether or not the read first authenticator and second authenticator match each other. When the two are judged not to match (step S307), the control unit 406 instructs the display unit 404 and the display unit 405 to display a message to that effect, and the display unit 404 and the display unit 405 display the message (step S308). The control unit 406 then ends the electronic money usage processing.

When the two are judged to match (step S307), the control unit 406 extracts the identification flag, the electronic money ID and the amount from the received electronic money, and concatenates the identification flag, the electronic money ID and the amount in the stated order, to generate a concatenated entity. The control unit 406 then uses the received public key PK to subject the generated concatenated entity and the read first authenticator to a digital signature (step S309). When the result of verification is failure (step S310), the control unit 406 instructs the display unit 404 and the display unit 405 to display a message to that extent, and the display unit 404 and the display unit 405 display the message (step S311). The control unit 406 then ends the electronic money usage processing.

When the result of verification is success (step S310), the control unit 406 stores the electronic money in the same way as at step S252 (step S312), and performs account settlement processing in the same way as at step S253 (step S313). Next, the control unit 406 outputs success notification that shows that the verification result is success (step S314), and the control unit 302 deletes the stored electronic money from the information storage unit 304 (step S315).

(Conclusion of Modification)

As has been described, in the electronic money usage system 10a, the memory card 300 possessed by the user acquires signature-type or cash-type electronic money from the bank server apparatus 100 via the mobile phone 200. When the acquired electronic money is cash-type, it is stored in the memory card 300 as is. When the acquired electronic money is signature-type, the memory card 300 receives the first password from the user via the mobile phone 200, and uses the first password and the identification flag, the electronic money ID and the amount included in the acquired electronic money to generate the first authenticator, and writes the generated first authenticator in the electronic money.

When using the electronic money, the memory card 300 is mounted in the input/output unit 410 of the register apparatus 400.

When the electronic money stored in the memory card 300 is cash-type, the memory card 300 securely outputs the electronic money to the register apparatus 400, and the register apparatus performs account settlement with the received electronic money.

When the electronic money stored in the memory card 300 is signature-type, the memory card 300 receives the second password from the user via the input/output unit 410 of the register apparatus 400, uses the second password and the identification flag, the electronic money ID and the amount included in the signature-type electronic money stored in the memory card 300 to generate the second authenticator, and writes the generated second authenticator in the electronic money.

Next, the memory card 300 securely outputs the signature-type electronic money that includes the first authenticator and the second authenticator to the register apparatus 400, and the register apparatus 400 receives the signature-type electronic money.

Next, the register apparatus 400 extracts the first authenticator and the second authenticator from the received electronic money, and compares the extracted first authenticator and second authenticator. If the two match, the register apparatus 400 treats the received signature-type electronic money as legitimate, and performs account settlement using the received electronic money.

In this way, the register apparatus 400 judges whether or not the first authenticator generated using the first password input by the user when acquiring the signature-type electronic money matches the second authenticator generated using the second password input by the user when using the signature-type electronic money, and when the two match, the electronic money is treated as being legitimate.

As with the electronic money usage system 10, if the user at the time of acquiring the electronic value and the user at the time of using the electronic value are the same person, identical first data and second data will be able to be provided, and therefore the first authenticator and the second authenticator will of course match.

However, if the memory card storing the signature-type electronic money is lost or stolen, a person that attempts to dishonestly use the signature-type electronic money stored in the memory card does not know the first password. Consequently, if a second password that is different to the first password is input via the input/output unit 410 of the register apparatus 400, the second authenticator that is generated as a result will not match the first authenticator generated using the first password, and therefore the register apparatus 400 does not treat the received electronic money as legitimate.

In this way, signature-type electronic money can be protected from dishonest usage.

3. Other Modifications

Although the present invention has been described based on the above preferred embodiment, the present invention is not limited to the preferred embodiment and modifications thereof. Cases such as the following are included in the present invention.

(1) In the preferred embodiment, electronic money is described as being stored in the memory card 300 which is a portable medium. However, the mobile phone may include therein a structure the same as the memory card 300. In other words, the same structure as the memory card 300 may be included in the mobile phone such that it is not removable from the mobile phone.

In such a case, the mobile phone and the register apparatus 400 each include a short-distance radio communication unit, and communicate via these short-distance radio communication units using a method such as a short-distance radio communication method.

Instead of the mobile phone 200, the electronic money usage system 10 may include a mobile information terminal apparatus that includes the same structure as the mobile phone 200.

The memory card 300 may further include a short-distance radio communication unit, and the register apparatus 400 may further include a short-distance radio communication unit, and the memory card 300 and the register apparatus 400 may communicate with each other via these short-distance radio communication units using a method such as a short-distance radio communication method. The memory card 300 may remain mounted in the mobile phone apparatus 200 when the short-distance radio communication takes place.

(2) In the preferred embodiment, the user selects and acquires either cash-type electronic money or signature-type electronic money. However, the present invention may have a structure such that only signature-type electronic money can be acquired.

(3) The preferred embodiment and modifications may be structured in the following way.

The banks server 100 and the register apparatus may be connected via the Internet 20 and have a safe communication path.

As shown in FIG. 2, the information storage unit 102 of the bank server apparatus 100 stores the issued electronic money table 151. When the reissue section in a piece of issue information in the issued electronic money tale 151 is "0", the bank server apparatus 100 generates new electronic money in response to a request from the user. The request from the user when, for instance, he/she has lost the memory card 300. The bank server apparatus 100 transmits the generated electronic money to the memory card via the mobile phone 200. At this time, the bank server apparatus 100 sets the reissue section included in the piece of issue information to "1". The bank server apparatus 100 also generates a piece of issue information corresponding to the newly generated electronic money, and adds the generated piece of issue information to the issued electronic money table 151.

When the reissue section in a piece of issue information in the issued electronic money table 151 is "1", the bank server apparatus 100 does not newly generate electronic money in response to a request from a user.

Furthermore, when the second authenticator is generated at the time of using the signature-type electronic money stored in the memory card 300, the memory card 300 transmits usage information showing that the electronic money is used, to the bank server apparatus 100 via the register apparatus 400. Included in this usage information includes the user ID that identifies the user of the memory card 300, and the electronic money ID included in the electronic money.

On receiving the usage information that includes the user ID and the electronic money ID, the bank server apparatus 100 extracts the piece of issue information that includes the received user ID and electronic money ID from the issued electronic money table 151. The bank server apparatus 100 writes the reissue section in the extracted piece of issue information to "1", and then overwrites the piece of issue information in the issued electronic money table 151 with the piece of issue information that has the updated reissue section. In this case, since the reissue section is "1", new electronic money will not be issued.

Note that in the case of the above (1), a mobile phone that includes therein the same structure as the memory card 300 may transmit the user information to the bank server apparatus 100.

(4) The above preferred embodiment and modifications are based on the assumption that the whole of the amount included in the electronic money is used when signature-type electronic money is used. An example of this is when a 10,000 yen purchase is made, electronic money equivalent in value to 10,000 yen of currency is used. However, is it possible to use only part of the amount included in the electronic money. For instance, when making a 1,000 purchase, electronic money equivalent in value to 10,000 yen may be used for the 1,000 purchase, with only 1,000 yen of the 10,000 yen amount of the electronic money actually being used, and the balance 9,000 yen remaining as electronic money.

Figure 14:
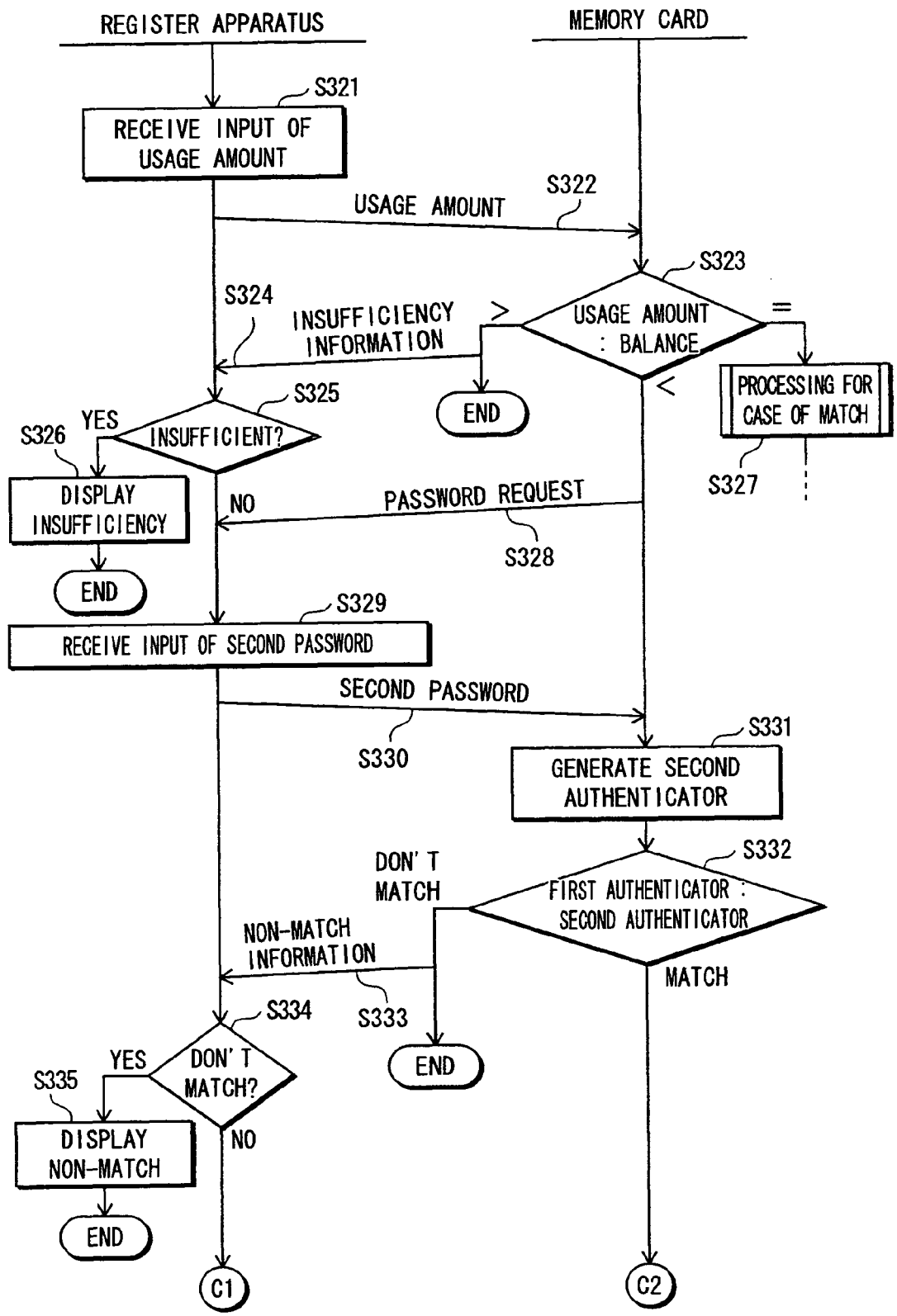
FIG. 14 is a flowchart showing operations for using electronic money in the electronic money usage system 10, in particular operations when using part of an amount included in electronic money, and continues in FIG. 15.
Figure 15:
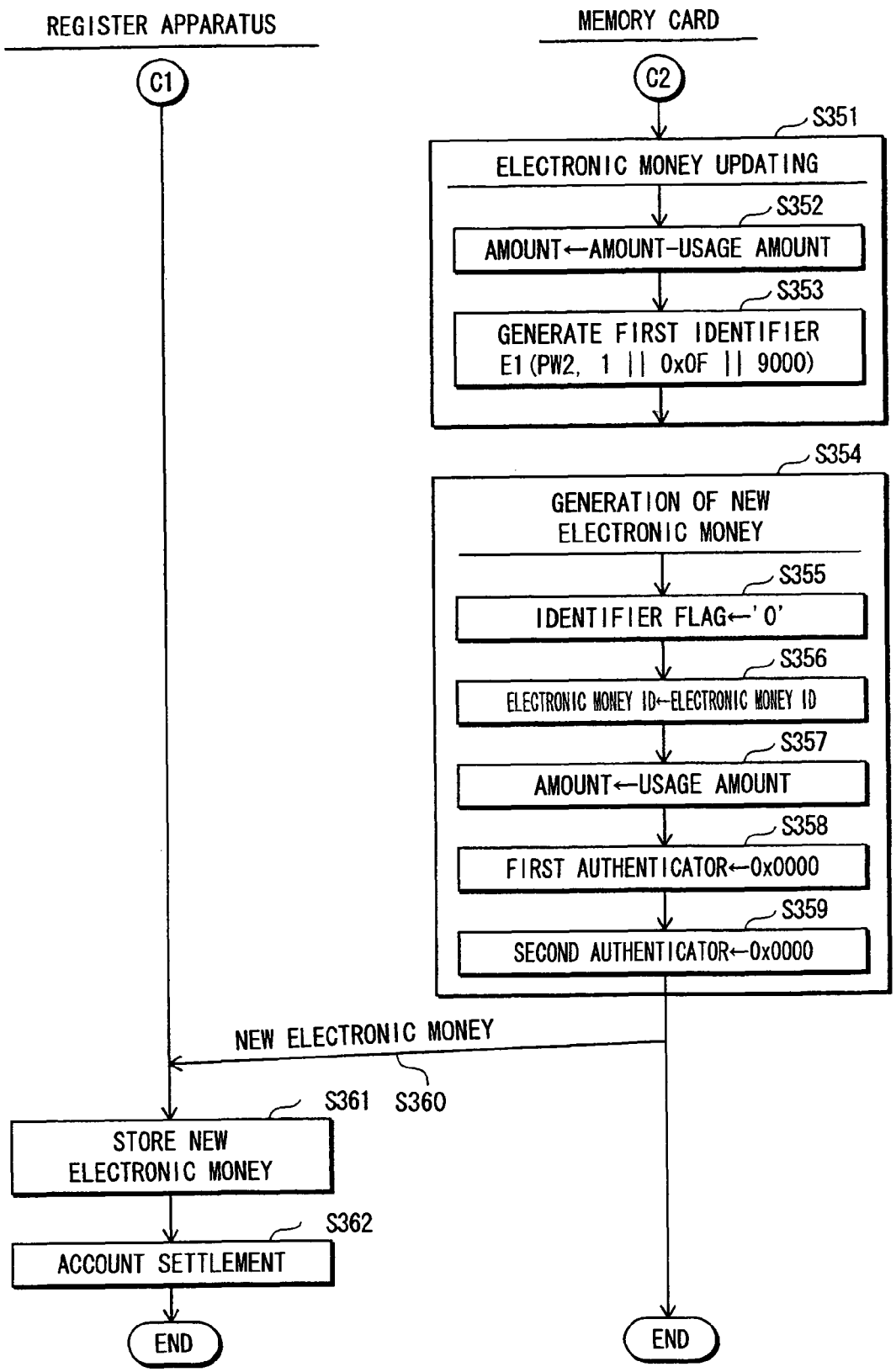
FIG. 15 is a flowchart showing operations for using electronic money in the electronic money usage system 10, in particular operations when using part of an amount included in electronic money, and continues from FIG. 14.

Operations for using electronic money in the electronic money usage system 10 in this case are described with use of the flowchart shown in FIG. 14 and FIG. 15. Note that operations for acquiring electronic money are the same as in the electronic money usage system 10.

The information storage unit 304 of the memory card 300 stores electronic money 511 shown in FIG. 16A. This electronic money 511 is used in the following. As shown in FIG. 16A, the electronic money 511 is composed of an identification flag "1", an electronic money ID "0x0F", an amount "10000", a first authenticator "E1 (PW1,1||0x0F||10000)", and a second authenticator "blank".

The control unit 406 of the register apparatus 400 receives a sale amount (usage amount) from the operator of the register apparatus 400 (step S321), and outputs the usage amount to the memory card 300 via the input/output unit 410 (step S322).

The control unit 302 receives the usage amount from the register apparatus 400 via the input/output unit 301 (step S322), and compares the received usage amount and the amount (balance) of the electronic money 511 stored in the information storage unit 304. If the usage amount and the balance match (step S323), subsequent processing is the same as in the electronic money usage system 10 (step S327).

When the usage amount is greater than the balance (step S323), the control unit 302 outputs insufficiency information showing that the amount is insufficient, to the register apparatus 400 via the input/output unit 301 (step S324). The control unit 302 then ends the electronic money usage processing. When the received information is insufficiency information (step S325), the control unit 406 outputs a message to that effect to the display unit 404 and the display unit 405, and the display unit 404 and the display unit 405 display the message (step S326). The control unit 406 then ends the electronic money usage processing.

When the usage amount is less than the balance (step S323), the control unit 302 outputs a password request to the register apparatus 400 via the input/output unit 301 (step S328). The input/output unit 410 receives input of the second password from the user, under the control of the control unit 406 (step S329), and the control unit 406 securely outputs the second password to the memory card (step S330). The control unit 302 receives the second password (step S330), generates a second authenticator in the same way as at step S237 using the received second password (step S331), and compares the first authenticator and the second authenticator in the same way as at step S242. If the first authenticator and the second authenticator do not match (step S332), the control unit 302 transmits non-match information showing that the two authenticators do not match, to the register apparatus 400 (step S333). If the received information is non-match information showing that the two authenticators do not match (step S334), the control unit 406 outputs a message to that effect to the display unit 404 and the display unit 405, and the display unit 404 and the display unit 405 display the message (step S335). The control unit 406 then ends the electronic money usage processing.

If the first authenticator and the second authenticator match (step S332), the control unit 302 updates the electronic money (step S351).

Details of the updating of the electronic money are as follows.

The control unit 302 subtracts the usage amount from the amount included in the electronic money 511, and overwrites the amount with the result (step S352). The control unit 302 then extracts the identification flag, the electronic money ID and the amount from the electronic money, and concatenates these in the stated order, to generate a concatenated entity. The control unit 302 then subjects the generated concatenated entity to the encryption algorithm E1 using the received second password, and overwrites the electronic money such that the first authenticator stored therein is the generated first authenticator.

First authenticator Sign1=E1(second password PW2, identification flag∥electronic money ID∥amount) (step S353).

Here, as shown in FIG. 16B, the electronic money is electronic money 512, and is composed of an identification flag "1", an electronic money ID "0x0F", an amount "9000", a first authenticator "E1 (PW2,1 ∥0x0F∥9000)", and a second authenticator "blank".

Next, the control unit 302 generates new electronic money (step S354).

Details of the generating of the electronic money are as follows.

The control unit 302 sets the identification flag "0" (step S355), sets the electronic money ID to have the same value as the original electronic money ID (step S356), sets the amount to be equivalent to the usage amount (step S357), sets the first authenticator to "0x0000" (step S358), and sets the second authenticator to "0x0000" (step S359).

As shown in FIG. 16C, the new electronic money is electronic money 513, and is composed of an identification flag "0", an electronic money ID "0x00", an amount "1000", a first authenticator "0x0000", and a second authenticator "0x0000".

Next, the control unit 302 securely outputs the generated new electronic money to the register apparatus 400 via the input/output unit 301 (step S360).

The control unit 406 receives the new electronic money from the memory card 300 (step S360), stores the received new electronic money internally (step S361), then performs account settlement processing using the received new electronic money (step S362).

(5) In the preferred embodiment and modifications, a single piece of electronic money includes a single amount. However, a single piece of electronic money may include a plurality of amounts. The amounts may be used one at a time, and each time one of the amounts is used, that used amount is deleted from the electronic money.

An example of this electronic money is shown in FIG. 17.

Electronic money 521 shown in FIG. 17 is composed of a header 531, and amount sections 532, 533, . . . 534.

The header 531 includes an identification flag and an electronic money ID. The identification flag and the electronic money ID are as already described.

Each amount section includes an amount, a first authenticator and a second authenticator. The amount, first authenticator and second authenticator are as already described.

The bank server apparatus 100 outputs the electronic money 521 to the memory card 300. Note that the first and second authenticators in each amount section in the electronic money 521 are blank at this point.

Upon receiving the electronic money 521, the memory card 300 generates the first authenticator for each amount section, and overwrites each amount section so as to include the generated first authenticator.

When using any of the amount sections in the electronic money, the memory card 300 generates a second authenticator, compares the first authenticator and the second authenticator, and when the two match, generates cash-type electronic money composed of the header and the particular amount section. Here, the first and second authenticators in the particular amount section are "0x0000". Next, the memory card 300 outputs the generated cash-type electronic money to the register apparatus 400. The memory card 300 deletes the particular amount section from the electronic money 521.

The register apparatus 400 receives the cash-type electronic money, and performs account settlement processing using the received electronic money.

(6) In the electronic money usage system 10, the first authenticator and the second authenticator included in the electronic money may be generated using another encryption algorithm or another public key encryption digital signature. Furthermore, the first authenticator and the second authenticator may be generated using another digital signature. Alternatively, the first authenticator and the second authenticator may be generated using another operation, examples of which include a exclusive OR and a hash function.

(7) In the electronic money usage system 10, the electronic money output from the memory card 300 to the register apparatus 400 may have a data structure that does not include an identification flag and an electronic money ID. In other words, the electronic money may include only an amount.

(8) In the electronic money system 10a, the memory card 300 may store a user's first stored password therein in advance, and when acquiring the electronic money, the memory card 300 may make a request to the user, via the mobile phone 200, to input a first input password. Having received the first input password, the memory card 300 may judge whether or not the first stored password and the first input password match, and when the two are judged not to match, refuse electronic money acquisition. On the other hand, when the two are judged to match, the memory card 300 may permit electronic money acquisition.

Here, the memory card 300 stores a memory card private key in secret, and the register apparatus 400 stores a memory card public key generated corresponding to the memory card private key. When the aforementioned passwords are judged to match, the memory card 300 subjects a concatenated entity of the identification flag, the electronic money ID and the amount included in the received electronic money to a digital signature using the memory card private key, thereby generating a first authenticator. The memory card 300 then writes the generated first authenticator in the electronic money.

The register apparatus 400 stores the user's second stored password therein, and when the electronic money is being used, the register apparatus 400 makes a request to the user to input a second input password, receives the second input password, judges whether or not the second stored password and the second input password match, and when the two do not match, refuses electronic money usage.

On the other hand, when the two are judged to match, the register apparatus 400 receives the electronic money from the memory card 300, extracts the first authenticator from the received electronic money, and subjects the electronic money and the first authenticator to digital signature verification using the stored memory card public key. The register apparatus 400 refuses electronic money usage when the verification result is failure, and permits electronic money usage when the verification result is success.

(9) In the preferred embodiment and modifications, instead of the user inputting a password, biometric information of the user may be used. For instance, the user's fingerprint information or iris information may be used.

(10) The preferred embodiment and modifications use an example that in the case of the electronic money being signature-type, the first authenticator and the second authenticator are authentication-use data generated based on the password input by the user and the identification flag, electronic money ID and amount included in the electronic money (see FIGS. 3A and 3B).

However, the present invention is not limited to this structure. The first authenticator and the second authenticator may be the input password itself.

(11) In the preferred embodiment, the control unit 302 of the memory card 300 bit concatenates, in the stated order, the identification flag, electronic money ID and amount extracted from the electronic money that includes the same amount as the received sale amount, to generate a concatenated entity; subjects the generated concatenated entity to the encryption algorithm E1 using the generated second decrypted password PW2, thereby generating a second authenticator; overwrites the second authenticator in the electronic money in the information storage unit 304 with the generated second authenticator; extracts the first authenticator and the second authenticator from the electronic money; and judges whether or not the extracted first authenticator and the extracted second authenticator match. However, instead of overwriting the electronic money to include the generated second authenticator, the control unit 302 may compare the generated second authenticator with the extracted first authenticator directly after generating the second authenticator.

(12) In the preferred embodiment and modifications, electronic money is used in place of currency, but the present invention is not limited to this structure. Instead of electronic money, electronic value information such as electronic coupons, bonus points, frequent flier points or the like may be used.

(13) Each described apparatus is, specifically, a computer system composed of a microprocessor, a ROM, a RAM, and the like. Computer programs are stored in the RAM. The computer program is composed of a plurality of instruction codes showing instructions with respect to a computer in order to have predetermined functions achieved. Each apparatus achieves predetermined functions by the microprocessor operating according to the computer programs. In other words, the microprocessor reads one of the instructions included in the computer program at a time, decodes the read instruction, and operates in accordance with the result of the decoding.

(14) All or part of the compositional elements of each apparatus may be composed of one system LSI (Large Scale Integrated circuit). The system LSI is a super-multifunctional LSI on which a plurality of compositional units are manufactured integrated on one chip, and is specifically a computer system that includes a microprocessor, a ROM, a RAM, or the like. Computer programs are stored in the RAM. The system LSI achieves its functions by the microprocessor operating according to the computer programs.

Furthermore, the units that are the compositional elements of each of the apparatuses may be realized separately with individual chips, or part or all may be included on one chip.

Here, the LSI may be an IC, a system LSI, a super LSI, or ultra LSI, depending on the degree of integration.

Furthermore, the integration of circuits is not limited to being realized with LSI, but may be realized with a special-purpose circuit or a general-use processor. Alternatively, the integration may be realized with use of a FPGA (field programmable gate array) that is programmable after manufacturing of the LSI, or a re-configurable processor that enables re-configuration of the connection and settings of circuit cells in the LSI.

(15) Part or all of the compositional elements of each apparatus may be composed of a removable IC card or a single module. The IC card or the module is a computer system composed of a microprocessor, a ROM, a RAM, and the like. The IC card or the module may be included in the aforementioned super-multifunctional LSI. The IC card or the module achieves its functions by the microprocessor operating according to computer programs. The IC card or the module may be tamper-resistant.

(16) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on a electric communication network, a wireless or wired communication network, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(17) The present invention may be any combination of the above-described embodiment and modifications.

INDUSTRIAL APPLICABILITY

The apparatuses, recording medium and electronic value of the present invention can be used for managerially, in other words, repeatedly and continuously, in general industries in which general transactions are performed. Furthermore, the apparatuses and recording medium of the present invention can be manufactured and sold managerially, in other words, repeatedly and continuously, in an electronic device manufacturing industry.

The invention claimed is:

1. An electronic value usage system for using an electronic value that is information representing a value electronically, the electronic value usage system comprising:
at least one memory that stores a plurality of commands; and
at least one processor operable to execute the plurality of commands, wherein by executing the commands, the electronic value usage system executes the following steps:
a value acquisition step of acquiring value information from a server apparatus over a network;
a first acquisition step of acquiring first data by an input from a user when storing the value information;
a first generation step of generating a first authenticator with use of the value information and the acquired first data;
a storage step of storing the value information and the first authenticator in correspondence with each other as an electronic value;
a second acquisition step of acquiring second data and a usage amount showing usage of a partial value that is part of a value shown by the value information, by an input from the user when the user uses the electronic value;
a second generation step of generating a second authenticator with use of the value information and the acquired second data;
a calculation step of subtracting the partial value from the value shown by the value information, thereby calculating a remaining value;
a judgment step of judging whether or not the first authenticator and the second authenticator match each other;
a third generation step of, when the first authenticator and the second authenticator are judged to match each other, generating a third authenticator with use of the second data and the calculated remaining value; and
a permission step of, when the first authenticator and the second authenticator are judged to match each other, permitting the usage of the partial value, wherein
the storage step further stores, in place of the electronic value, the remaining value and the third authenticator in correspondence with each other as a new electronic value.

2. The electronic value usage system of claim 1, including an electronic purse apparatus and an account settlement apparatus, wherein
the electronic purse apparatus executes the value acquisition step, the first acquisition step, the first generation step, the storage step, the second acquisition step, the second generation step, the calculation step, the judgment step, and the third generation step, and
the account settlement apparatus executes the permission step.

3. The electronic value usage system of claim 1, wherein the electronic value usage system is an electronic purse apparatus that is a portable IC card.

4. An electronic purse apparatus that stores and manages an electronic value that is information representing a value electronically, the electronic purse apparatus comprising:
a memory that stores a plurality of commands; and
a processor operable to execute the plurality of commands, wherein
by executing the commands, the electronic purse apparatus executes the following steps:
a value acquisition step of acquiring value information from a server apparatus over a network;
a first acquisition step of acquiring first data by an input from a user when storing the value information;
a first generation step of generating a first authenticator with use of the value information and the acquired first data;
a storage step of storing the value information and the first authenticator in correspondence with each other as an electronic value;
a second acquisition step of acquiring second data and a usage amount showing usage of a partial value that is part of a value shown by the value information, by an input from the user when the user uses the electronic value;
a second generation step of generating a second authenticator with use of the value information and the acquired second data;
a calculation step of subtracting the partial value from the value shown by the value information, thereby calculating a remaining value;
a judgment step of judging whether or not the first authenticator and the second authenticator match each other;
a third generation step of, when the first authenticator and the second authenticator are judged to match each other, generating a third authenticator with use of the second data and the calculated remaining value; and
an output step of, when the first authenticator and the second authenticator are judged to match each other, outputting usage value information showing the partial value, wherein
the storage step further stores, in place of the electronic value, the remaining value and the third authenticator in correspondence with each other as a new electronic value.

5. The electronic purse apparatus of claim 4, wherein
the first generation step generates the first authenticator by subjecting the value information to one of encryption and digital signature, with use of the acquired first data, and
the second generation step generates the second authenticator by subjecting the value information to one of encryption and digital signature, with use of the acquired second data.

6. An electronic value management method used in an electronic purse apparatus that stores and manages an electronic value that is information representing a value electronically, the electronic value management method comprising the following steps:
a value acquisition step of acquiring value information from a server apparatus over a network;
a first acquisition step of acquiring first data by an input from a user when storing the value information;
a first generation step of generating a first authenticator with use of the value information and the acquired first data;
a storage step of storing the value information and the first authenticator in correspondence with each other as an electronic value;
a second acquisition step of acquiring second data and a usage amount showing usage of a partial value that is part of a value shown by the value information, by an input from the user when the user uses the electronic value;
a second generation step of generating a second authenticator with use of the value information and the acquired second data;
a calculation step of subtracting the partial value from the value shown by the value information, thereby calculating a remaining value;
a judgment step of judging, using a processor, whether or not the first authenticator and the second authenticator match each other;
a third generation step of, when the first authenticator and the second authenticator are judged to match each other, generating a third authenticator with use of the second data and the calculated remaining value; and an output step of, when the first authenticator and the second authenticator are judged to match each other, outputting usage value information showing the partial value, wherein the storage step further stores, in place of the electronic value, the remaining value and the third authenticator in correspondence with each other as a new electronic value.

7. A non-transitory computer readable recording medium on which an electronic value management computer program is recorded, for use in an electronic purse apparatus that stores and manages an electronic value that is information representing a value electronically, the computer program causing the electronic purse apparatus to perform a method comprising:

a value acquisition step of acquiring value information from a server apparatus over a network;

a first acquisition step of acquiring first data by an input from a user when storing the value information;

a first generation step of generating a first authenticator with use of the value information and the acquired first data;

a storage step of storing the value information and the first authenticator in correspondence with each other as an electronic value;

a second acquisition step of acquiring second data and a usage amount showing usage of a partial value that is part of a value shown by the value information, by an input from the user when the user uses the electronic value;

a second generation step of generating a second authenticator with use of the value information and the acquired second data;

a calculation step of subtracting the partial value from the value shown by the value information, thereby calculating a remaining value;

a judgment step of judging, using a processor, whether or not the first authenticator and the second authenticator match each other;

a third generation step of, when the first authenticator and the second authenticator are judged to match each other, generating a third authenticator with use of the second data and the calculated remaining value; and an output step of, when the first authenticator and the second authenticator are judged to match each other, outputting usage value information showing the partial value, wherein the storage step further stores, in place of the electronic value, the remaining value and the third authenticator in correspondence with each other as a new electronic value.

8. An integrated circuit that stores and manages an electronic value that is information representing a value electronically, the integrated circuit comprising:

at least one memory that stores a plurality of commands; and at least one processor operable to execute the plurality of commands, wherein by executing the commands, the integrated circuit executes the following steps:

a value acquisition step of acquiring value information from a server apparatus over a network;

a first acquisition step of acquiring first data by an input from a user when storing the value information;

a first generation step of generating a first authenticator with use of the value information and the acquired first data;

a storage step of storing the value information and the first authenticator in correspondence with each other as an electronic value;

a second acquisition step of acquiring second data and a usage amount showing usage of a partial value that is part of a value shown by the value information, by an input from the user when the user uses the electronic value;

a second generation step of generating a second authenticator with use of the value information and the acquired second data;

a calculation step of subtracting the partial value from the value shown by the value information, thereby calculating a remaining value;

a judgment step of judging whether or not the first authenticator and the second authenticator match each other;

a third generation step of, when the first authenticator and the second authenticator are judged to match each other, generating a third authenticator with use of the second data and the calculated remaining value; and an output step of, when the first authenticator and the second authenticator are judged to match each other, outputting usage value information showing the partial value, wherein the storage step further stores, in place of the electronic value, the remaining value and the third authenticator in correspondence with each other as a new electronic value.

9. The electronic purse apparatus of claim 4, wherein the first generation step generates the first authenticator with use of a concatenated entity obtained by concatenating the first data and the value information, and the second generation step generates the second authenticator with use of a concatenated entity obtained by concatenating the second data and the value information.

10. The electronic purse apparatus of claim 4, wherein the first generation step generates the first authenticator by subjecting the value information to one of encryption and digital signature, with use of the acquired first data, and the second generation step generates the second authenticator by subjecting the value information to one of encryption and digital signature, with use of the acquired second data.

* * * * *

UNITED STATES PATENT AND TRADEMARK OFFICE
CERTIFICATE OF CORRECTION

| | | |
|---|---|---|
| PATENT NO. | : 7,912,789 B2 | Page 1 of 1 |
| APPLICATION NO. | : 11/632147 | |
| DATED | : March 22, 2011 | |
| INVENTOR(S) | : Toshihisa Nakano et al. | |

It is certified that error appears in the above-identified patent and that said Letters Patent is hereby corrected as shown below:

In column 38, claim 10 should read as follows:

--The electronic purse apparatus of Claim 4, wherein the value acquisition step further acquires other value information, the first generation step further generates a fourth authenticator using the acquired first data and the other value information, the storage step further stores the other value information and the fourth authenticator in correspondence as another electronic value, and the output step, when the user desires to use one or more electronic values, outputs respective value information of the one or more electronic values, as the usage value information, and deletes the one or more electronic values from the electronic purse apparatus.--

Signed and Sealed this
Nineteenth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,912,789 B2 | Page 1 of 1 |
| APPLICATION NO. | : 11/632147 | |
| DATED | : March 22, 2011 | |
| INVENTOR(S) | : Toshihisa Nakano et al. | |

It is certified that error appears in the above-identified patent and that said Letters Patent is hereby corrected as shown below:

In column 38, lines 47-55, claim 10 should read as follows:

--The electronic purse apparatus of Claim 4, wherein the value acquisition step further acquires other value information, the first generation step further generates a fourth authenticator using the acquired first data and the other value information, the storage step further stores the other value information and the fourth authenticator in correspondence as another electronic value, and the output step, when the user desires to use one or more electronic values, outputs respective value information of the one or more electronic values, as the usage value information, and deletes the one or more electronic values from the electronic purse apparatus.--

This certificate supersedes the Certificate of Correction issued July 19, 2011.

Signed and Sealed this

Sixteenth Day of August, 2011

David J. Kappos
*Director of the United States Patent and Trademark Office*